(12) United States Patent
Nishimoto et al.

(10) Patent No.: US 11,035,267 B2
(45) Date of Patent: Jun. 15, 2021

(54) WORKING MACHINE

(71) Applicant: KUBOTA CORPORATION, Osaka (JP)

(72) Inventors: Ryuki Nishimoto, Sakai (JP); Keisuke Miura, Sakai (JP); Ryosuke Kinugawa, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 16/661,448

(22) Filed: Oct. 23, 2019

(65) Prior Publication Data

US 2020/0056520 A1    Feb. 20, 2020

Related U.S. Application Data

(63) Continuation of application No. PCT/JP2018/016469, filed on Apr. 23, 2018.

(30) Foreign Application Priority Data

Apr. 25, 2017 (JP) .............................. JP2017-086522

(51) Int. Cl.
*F01N 3/023* (2006.01)
*B01D 46/42* (2006.01)

(52) U.S. Cl.
CPC ............. *F01N 3/023* (2013.01); *B01D 46/42* (2013.01); *F01N 2900/1606* (2013.01)

(58) Field of Classification Search
CPC ........ A01D 41/12; B01D 46/42; F01N 3/023; F01N 9/002; F01N 2430/00; F01N 2590/08; F01N 2900/1404; F01N 2900/1606
See application file for complete search history.

(56) References Cited

U.S. PATENT DOCUMENTS

| | | | | |
|---|---|---|---|---|
| 2013/0074481 A1* | 3/2013 | Miura | ................... | F02D 41/029 60/311 |
| 2013/0133315 A1* | 5/2013 | Shibutani | ................ | F01N 9/002 60/311 |

FOREIGN PATENT DOCUMENTS

| | | |
|---|---|---|
| JP | 2011236769 A | 11/2011 |
| JP | 2013160056 A | 8/2013 |
| JP | 2014025478 A | 2/2014 |
| JP | 2014238058 A | 12/2014 |

* cited by examiner

*Primary Examiner* — Brandon D Lee
(74) *Attorney, Agent, or Firm* — Greenblum & Bernstein, P.L.C.

(57) ABSTRACT

A working machine includes a manual switch, a filter to catch particulate matters included in exhaust gas that is exhausted from a prime mover, a first cleaning controller to perform automatic cleaning that automatically combusts the particulate matters when a deposits amount of the particulate matters caught by the filter is a first deposits amount threshold or more, a second cleaning controller to perform manual cleaning that combusts the particulate matters based on a command of the manual switch when the deposits amount is equal to or more than a second deposits amount threshold that is larger than the first deposits amount threshold, and a third cleaning controller to perform assist cleaning that combusts the particulate matters based on the command of the manual switch when the deposits amount is equal to or more than the first deposits amount threshold and smaller than the second deposits amount threshold.

18 Claims, 18 Drawing Sheets

WORKING MACHINE

CROSS-REFERENCE TO RELATED APPLICATIONS

The present application is a continuation application of International Application No. PCT/JP 2018/016469, filed Apr. 23, 2018, which claims priority to Japanese Patent Application No. 2017/086522, filed Apr. 25, 2017. The contents of these applications are incorporated herein by reference in their entirety.

BACKGROUND OF THE INVENTION

Field of the Invention

The present invention relates to a working machine having a filter for catching particulate matter that is included in exhaust gas of an engine.

Description of Related Art

A working machine disclosed in Japanese Unexamined Patent Application Publication No. 2013-160056 is previously known.

The working machine disclosed in Japanese Unexamined Patent Application Publication No. 2013-160056 has a filter that catches the Particulate Matter (PM) included in exhaust gas discharged from a prime mover. When the PM caught by the filter accumulates above a certain level, the filter cleaning for combusting and removing the PM is performed. As the filter cleaning, there is the automatic cleaning in which the PM is automatically combusted when the PM deposits amount is equal to or larger than a first deposits amount threshold, and there is the manual cleaning in which the PM is combusted by manual operation when the PM deposits amount is equal to or larger than a second deposits amount threshold that is larger than the first deposits amount threshold.

SUMMARY OF THE INVENTION

A working machine includes: a manual switch; a filter to catch particulate matters included in exhaust gas that is exhausted from a prime mover; a first cleaning controller to perform automatic cleaning that automatically combusts the particulate matters when a deposits amount of the particulate matters caught by the filter is a first deposits amount threshold or more; a second cleaning controller to perform manual cleaning that combusts the particulate matters based on a command of the manual switch when the deposits amount is equal to or more than a second deposits amount threshold that is larger than the first deposits amount threshold; and a third cleaning controller to perform assist cleaning that combusts the particulate matters based on the command of the manual switch when the deposits amount is equal to or more than the first deposits amount threshold and smaller than the second deposits amount threshold.

A diesel particulate filter cleaning method for a working machine, includes: judging whether a deposits amount of particulate matters caught in a filter is equal to or more than a first deposits amount threshold, the filter being configured to catch the particulate matters included in exhaust gas exhausted from a prime mover; performing automatic cleaning that automatically combusts the particulate matters when the deposits amount is a first deposits amount threshold or more; judging, after the automatic cleaning is stopped, whether the deposits amount of the particulate matters is equal to or more than the first deposits amount threshold and smaller than a second deposits amount threshold that is larger than the first deposits amount threshold; and performing, after the automatic cleaning is stopped, assist cleaning that combusts the particulate matters based on the command of a manual switch when the deposits amount is equal to or more than the first deposits amount threshold and smaller than the second deposits amount threshold.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
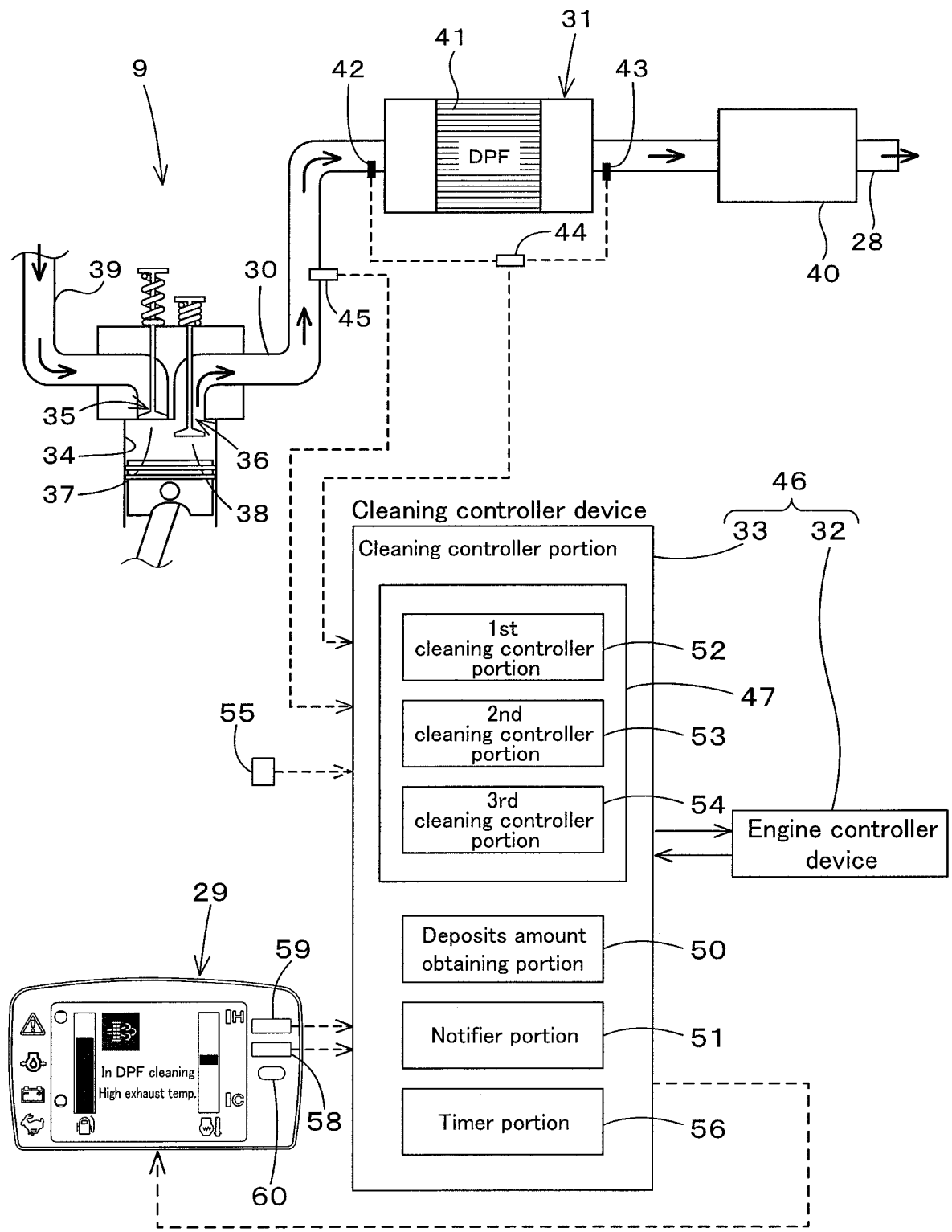
FIG. 1 is a view illustrating structures of an exhaust system and a control system according to a first embodiment of the present invention.

The embodiments will now be described with reference to the accompanying drawings, wherein like reference numerals designate corresponding or identical elements throughout the various drawings. The drawings are to be viewed in an orientation in which the reference numerals are viewed correctly.

Hereinafter, an embodiment of the present invention will be described with reference to the drawings as appropriate.

First Embodiment

Figure 18:
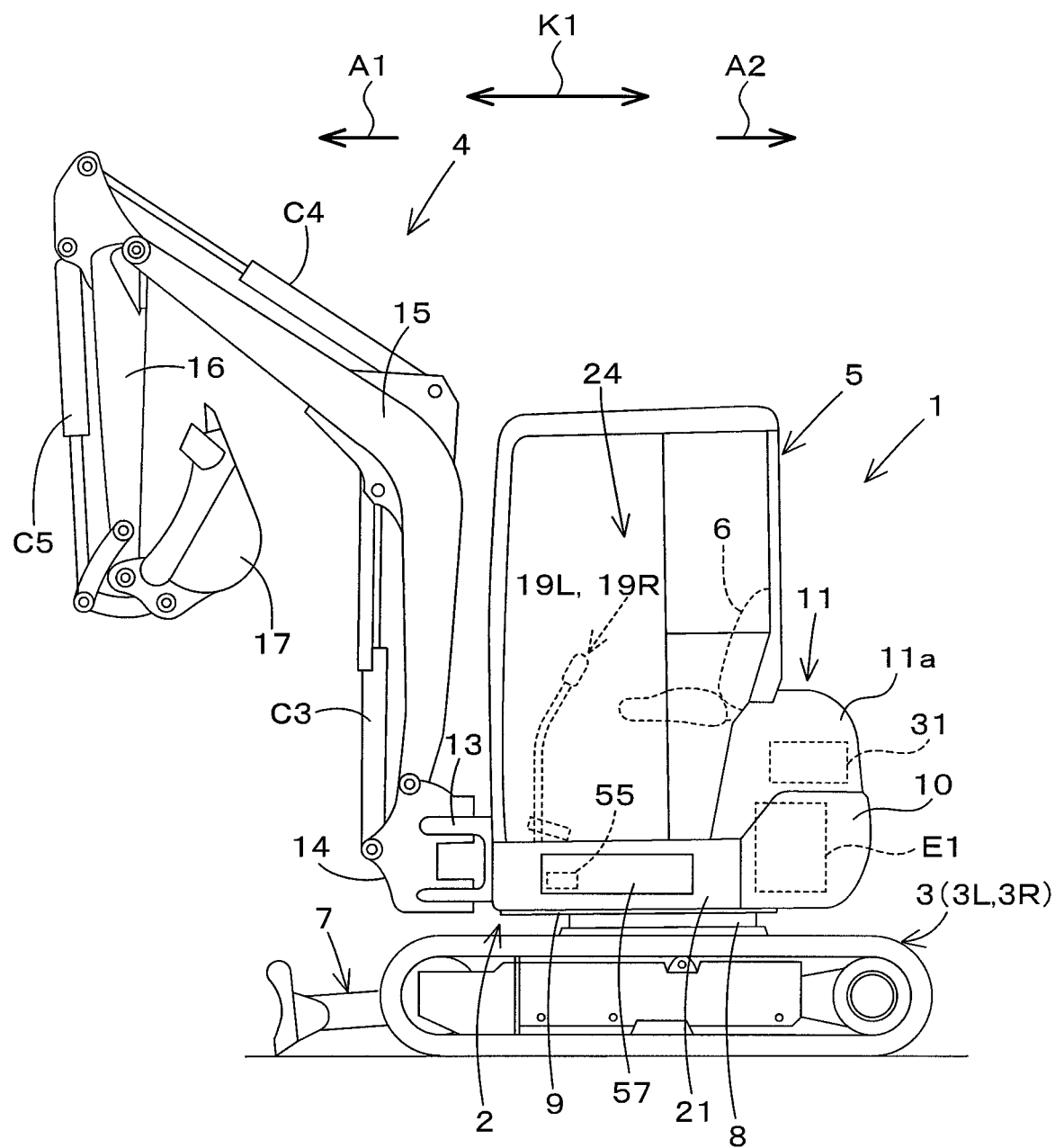
FIG. 18 is a side view of a working machine according to the embodiments.

FIG. 18 is a schematic side view showing the overall configuration of a working machine 1 according to a first embodiment of the present invention. In the present embodiment, a backhoe that is a swivel working machine is illustrated as the working machine 1. The working machine 1 may be a construction machine such as a Compact Track Loader (CTL) and a Skid Steer Loader (SSL) other than a backhoe, or may be an agricultural machine such as a tractor or a combine.

First, the overall configuration of the working machine 1 will be described with reference to FIG. 16 to FIG. 18.

As shown in FIG. 18, the working machine 1 includes a machine body (a turn base) 2, a traveling device 3, and a working device 4. A cabin 5 is mounted on the machine body 2. An operator seat 6 is provided inside the cabin 5.

In the present embodiment, the front side of the driver (operator) seated on the operator seat 6 of the working machine 1 (the direction indicated by an arrowed line A1 in FIG. 18) is referred to as the front, the rear side of the operator (the direction indicated by an arrowed line A2 in FIG. 18) is referred to as the rear, the left side of the operator (the front surface side of FIG. 18) is referred to as the left, and the right side of the operator (the back surface side of FIG. 18) is referred to as the left.

The horizontal direction, which is a direction orthogonal to the front-rear direction K1, will be described as the machine width direction. The direction separating from the center portion of the machine body 2 to the right or the left in the width direction will be described as a machine outward direction. In other words, the machine outward direction is a direction separating away from the center portion of the machine body 2 in the width direction. The direction opposite to the machine outward direction will be described as the machine inward direction. In other words, the machine inward direction is the machine width direction, that is, a direction approaching the center portion of the machine body 2 in the width direction.

As shown in FIG. 18, the traveling device 3 includes a traveling body 3L provided on the left side and a traveling body 3R provided on the right side. The traveling body 3L and the traveling body 3R are crawler-type traveling devices. The traveling bodies 3L and 3R support traveling motors. A dozer device 7 is attached to the front portion of the traveling device 3. The dozer device 7 can be moved up and down (can raise and lower the blade) by stretching and shortening the dozer cylinder.

The machine body 2 is supported on the traveling device 3 by a turn bearing 8 so as to be rotatable about a vertical axis (an axis extending in the vertical direction). The machine body 2 is driven to turn by a turning motor constituted of a hydraulic motor (a hydraulic actuator). The machine body 2 has a turn base plate 9 that turns around the vertical axis, and a weight 10. The turn base plate 9 is made of a steel plate or the like, and is connected to the turn bearing 8. The weight 10 is provided at the rear portion of the machine body 2. The turn base plate 9 constitutes a turn frame together with a reinforcing member, a support member, and the like each fixed on the turn base plate 9, and the side and the front of the turn frame are covered with a turn cover 21. In addition, the rear of the turn frame is covered with the weight 10.

A prime mover E1 is mounted on the rear portion of the machine body 2. The prime mover E1 is a diesel engine. The prime mover E1 may be an electric motor or may be a hybrid type having the diesel engine and the electric motor.

The engine room E2 covered with the bonnet 11 and formed inside the bonnet 11 is provided with an exhaust gas purification device 31 and a hydraulic pump P1. In addition, the engine room E2 is provided with a support frame 12 erected on the turn base plate 9. The bonnet 11 is supported by the support frame 12. The bonnet 11 has an opening/closing cover 11a that opens and closes the engine room E2. The opening/closing cover 11a is supported by the support frame 12 by a hinge member 11b so as to be swingable up and down. As shown in FIG. 16, the opening/closing cover 11a has a closed position where the engine room E2 is closed as shown by a reference numerals X1, and the opening/closing cover 11a can open the engine room E2 when swung upward from the closed position X1 to the opened position shown by a reference numeral X2.

Figure 16:
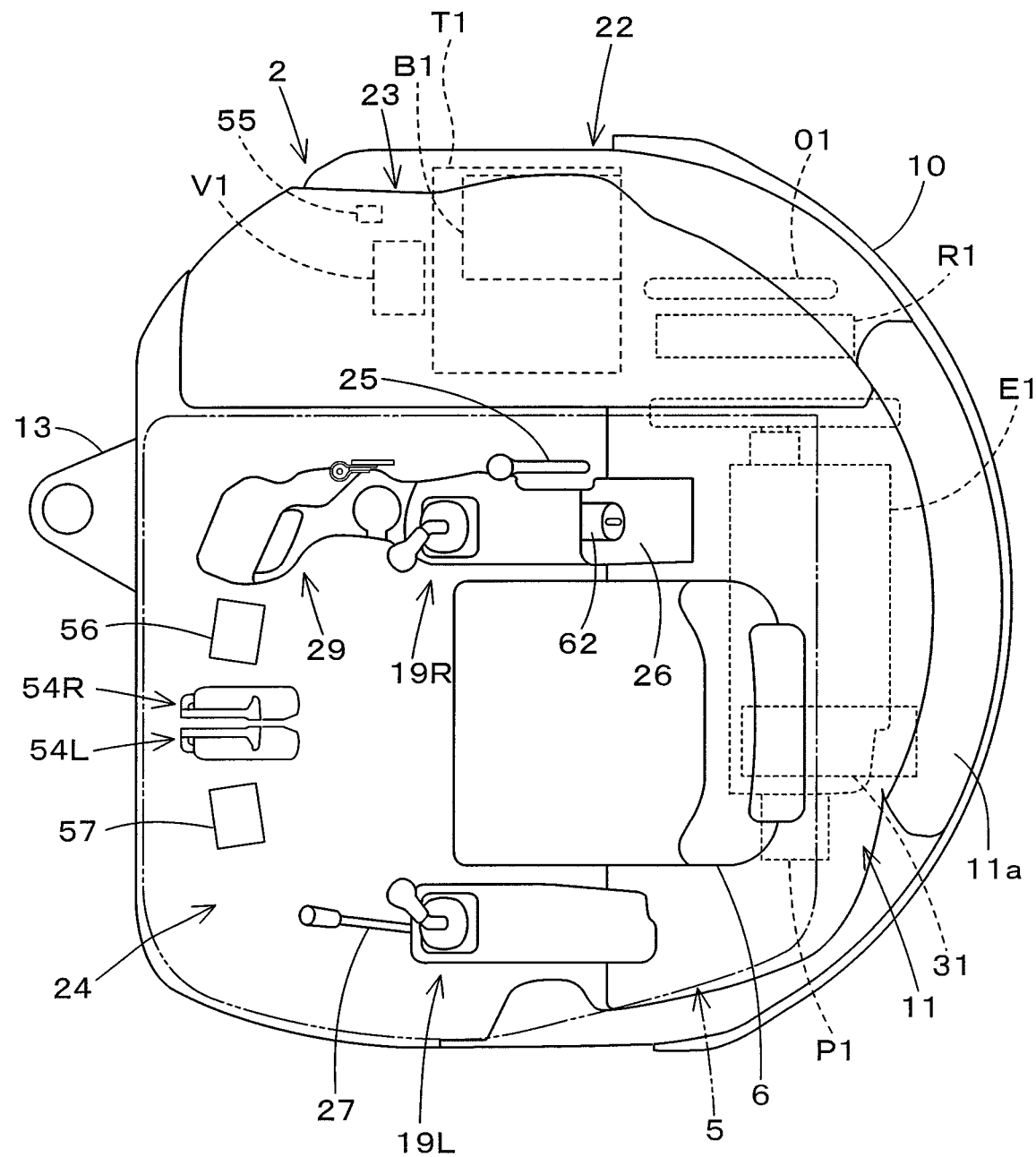
FIG. 16 is a plan view of a machine body according to the embodiments.

As shown in FIG. 16, a radiator R1, an oil cooler O1, an operation fluid tank T1, a battery B1, a control valve V1, and the like are arranged on the turn base plate 9, that is, on the right side of the cabin 5. The radiator R1, the oil cooler O1, the operation fluid tank T1, the battery B1 and the control valve V1 are covered with a side cover 22. The side cover 22 has, at the top, a hood 23 configured to be opened and closed.

That is, the machine body 2 is provided with driving devices such as the prime mover E1, the hydraulic pump P1, the exhaust gas purification device 31, the radiator R1, the oil cooler O1, the operation fluid tank T1, the battery B1, and the control valve V1, and these driving devices are surrounded by a cover device such as the bonnet 11 and the side cover 22. Note that the driving device provided in the machine body 2 is not limited to the above-described examples.

Figure 17:
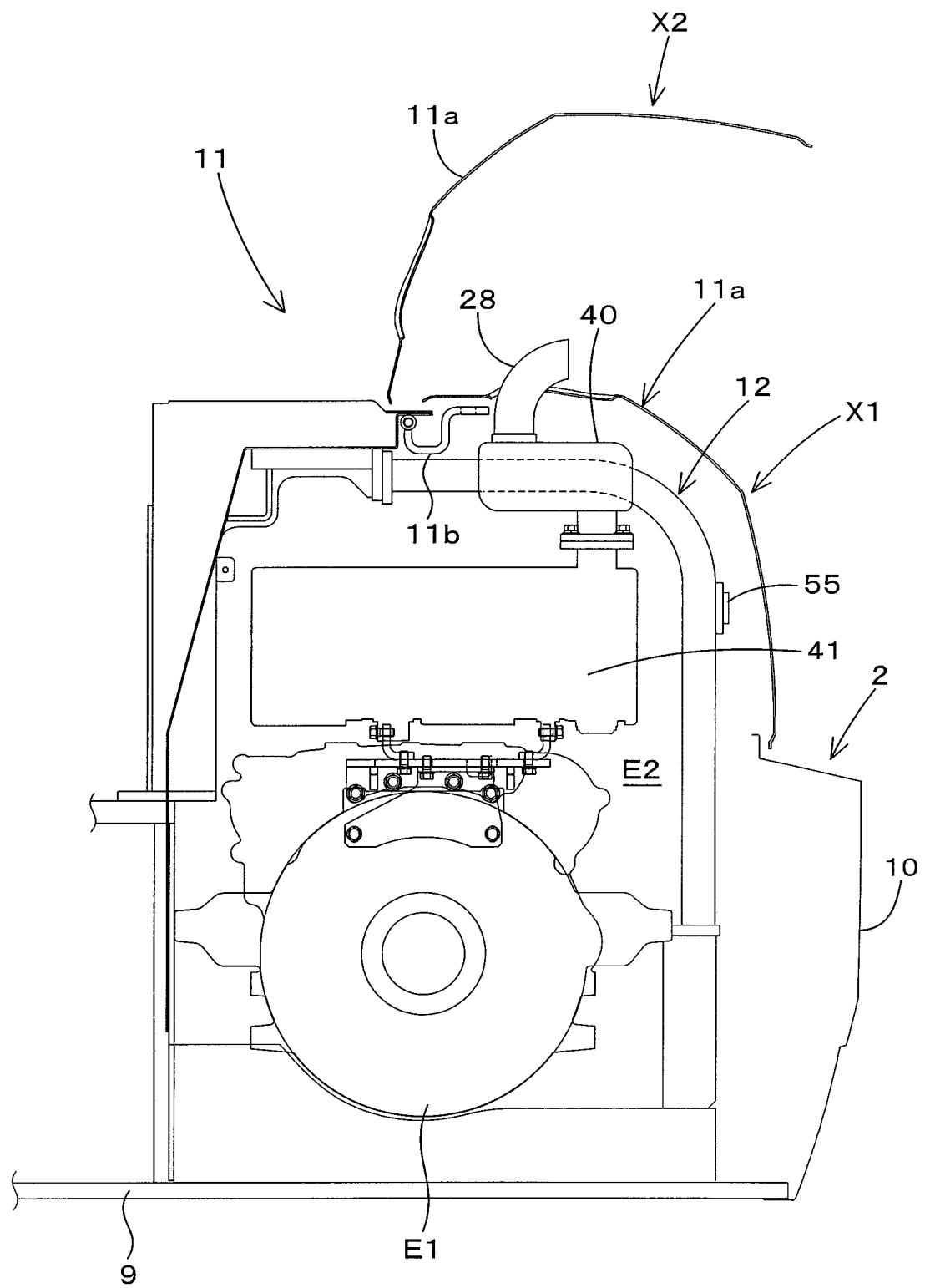
FIG. 17 is a cross-section view illustrating a rear portion of the machine body according to the embodiments.

As shown in FIG. 16 and FIG. 17, the machine body 2 has a support bracket 13 at the front portion slightly rightward from the center in the machine width direction. As shown in FIG. 18, a swing bracket 14 is attached to the support bracket 13 so as to be swingable about the vertical axis. The working device 4 is attached to the swing bracket 14.

The working device 4 includes a boom 15, an arm 16, and a bucket (a working tool) 17. The base portion of the boom 15 is pivotally attached to the swing bracket 14 so as to be rotatable about a lateral axis (an axis extending in the machine width direction). In this manner, the boom 15 is configured to swing up and down. The arm 16 is pivotally attached to the distal end side of the boom 15 so as to be rotatable about the lateral axis. In this manner, the arm 16 is configured to swing back and forth or up and down. The bucket 17 is provided on the distal end side of the arm 16 so as to perform a shoveling operation and a dumping operation. The working machine 1 can mount another working tool (auxiliary attachment) that is configured to be driven by a hydraulic actuator instead of or in addition to the bucket 17. Examples of other working tools (auxiliary attachments) include a hydraulic breaker, a hydraulic crusher, an angle broom, an earth auger, a pallet fork, a sweeper, a mower, and a snow blower.

The swing bracket 14 is configured to be swung by stretching and shortening of a swing cylinder provided in the machine body 2. The boom 15 is configured to be swung by the stretching and shortening of the boom cylinder C3. The arm 16 is configured to be swung by the stretching and shortening of the arm cylinder C4. The bucket 17 is configured to freely perform the shoveling operation and the dumping operation by the stretching and shortening of a bucket cylinder (a working tool cylinder) C5. The dozer cylinder, the swing cylinder, the boom cylinder C3, the arm cylinder C4, and the bucket cylinder C5 are constituted of hydraulic cylinders (hydraulic actuators).

Next, the steering portion will be described.

As shown in FIG. 16, the working machine 1 is provided with a steering portion 24 including the operator seat 6. In this embodiment, the steering portion 24 is provided in a space surrounded by the cabin 5, that is, inside the cabin 5.

The steering portion 24 is a portion around the operator seat 6, and includes a portion where devices and members installed on the working machine 1 relating to operation of machines, apparatuses, tools, members, and the like (for example, the prime mover E1, the machine body 2, the traveling device 3, the working device 4, and the like) are gathered.

The steering portion 24 includes a steering device 19L provided on the left side of the operator seat 6 and a steering device 19R provided on the right side of the operator seat 6. The steering device 19L operates the machine body 2 and the arm 16, for example. For example, the steering device 19R operates the boom 15 and the bucket 17. In addition, the steering portion 24 includes a dozer operation member 25 arranged on the right side of the operator seat 6. The dozer operation member 25 is a member configured to operate the dozer device 7.

In addition, the steering portion 24 includes travel operation members 54L and 54R, a swing operation member 56, and an SP operation member 57 provided in front of the operator seat 6. The traveling operation member 54L is a member configured to operate the traveling body 3L. The travel operation member 54L includes a lever and a pedal, and the travel body 3L can be operated with either the lever or the pedal. The traveling operation member 54R is a member configured to operate the traveling body 3R. The traveling operation member 54R also has a lever and a pedal, and the traveling body 3R can be operated with either the lever or the pedal. The swing operation member 56 is a member configured to operate the swing bracket 14. The SP operation member 57 is a member configured to operate a hydraulic attachment mounted instead of the bucket 17.

In addition, the steering portion 24 includes a control box 26 provided with a key cylinder (an ignition key cylinder) 62, the switches, and the lamps. The steering portion 24 has an unload lever 27 provided on the left side of the operator seat 6. When the unload lever 27 is lowered, the unload lever 27 is in a position that prevents the operator from getting off the working machine 1. By pulling up the unload lever 27 when the operator gets off the working machine 1, the measurement device 19L swings upward together with the unload lever 27, and thus a passage for getting off and getting on the working machine is secured. In the state where the unload lever 27 is pulled up, the operation fluid is not supplied to the hydraulic actuator of the working device 4.

In addition, the steering portion 24 is a meter, a monitor, and the like provided around the operator seat 6, and includes a display device 29 configured to display various information related to the working machine 1 (an operation state of the working machine 1). The display device 29 is provided in front of the steering device 19R.

Figure 3:
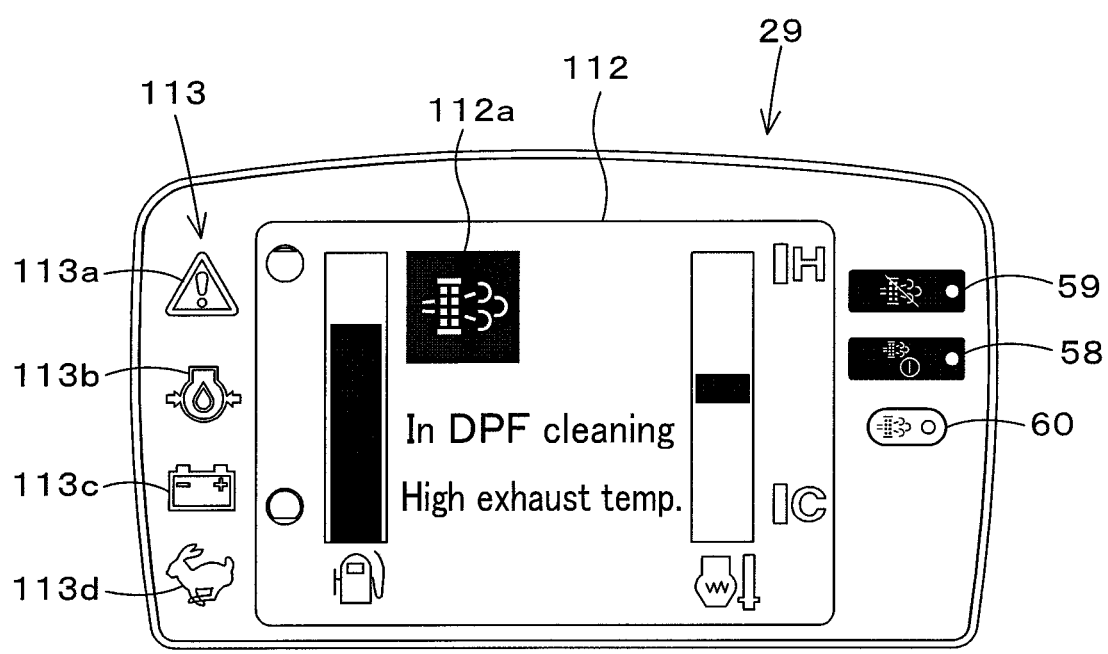
FIG. 3 is a view illustrating a display device according to the first embodiment.

As shown in FIG. 3, the display device 29 includes a liquid crystal panel 112, an LED display portion 113, and a second manual switch (a manual switch) 58.

The liquid crystal panel 112 is capable of freely displaying characters and figures with liquid crystal display, and is capable of freely changing the characters and figures to be displayed. For example, a fuel gauge indicating the remaining amount of fuel with a bar graph-like gauge is displayed on the left side of the liquid crystal panel 112, and the length of the gauge, that is, the length of the bar graph corresponds to the remaining amount of fuel. In addition, a water temperature gauge indicating the coolant temperature with a gauge is displayed on the right side of the liquid crystal panel, and a cursor indicating the current water temperature moves up and down in accordance with the water temperature.

In addition, in the central portion of the liquid crystal panel 112, character information for calling attention related to the DPF cleaning, which will be described later, and an icon 112a indicating that the DPF cleaning is currently performed are displayed. The type of information displayed on the liquid crystal panel 112 and the selection of display forms such as graphics and characters are arbitrary.

The LED display portion 113 displays detection information detected by a sensor or the like connected to the controller device 46 (the engine controller device 32 and the cleaning controller device 33) by turning on, turning off, or blinking the LED element. In particular, the LED display portion 113 includes a warning LED display portion 113a for indicating that a certain warning has been issued, a hydraulic LED display portion 113b for indicating a warning of engine oil pressure, a battery LED display portion 113c for indicating a warning of the charging state of the battery, a speed LED display portion 113d for indicating a speed warning, an exhaust LED display portion for indicating a warning of an exhaust temperature, and the like. The LED display portion 113 is capable of freely changing the display form not only based on the lighting, the extinguishing, and the blinking but also by changing the lighting time, the extinguishing time, the blinking interval, and the lighting brightness.

As shown in FIG. 1, the working machine 1 includes an exhaust gas purification device 31. The exhaust gas purification device 31 is a device configured to purify the exhaust gas discharged from the prime mover E1 and then discharge the gas to the external environment. The exhaust gas purification device 31 has a filter 41. The filter 41 is a filter configured to catch the Particulate Matters (PM) contained in the exhaust gas, and is a Diesel Particulate Filter (DPF). The DPF 41 is made of; for example, ceramic or metal, and has a honeycomb structure in cross section.

As shown in FIG. 1 and FIG. 17, the DPF 41 is arranged above the prime mover E1 inside the hood 11. The exhaust side of the DPF 41 is connected to a muffler 40 that reduces exhaust noise and to an exhaust pipe 28 that guides exhaust gas to the outside of the hood 11. The exhaust gas that has passed through the DPF 41 flows through the muffler 40 and the exhaust pipe 28, and then is exhausted above the bonnet 11. The DPF 41 is connected to the exhaust port 36 of the prime mover E1 through an exhaust manifold 30 serving as an exhaust gas flow path. The prime mover E1 is often a multi-cylinder engine having a plurality of cylinders (cylinders). FIG. 1 shows the configuration of a single of cylinders 34.

The exhaust port 36 is an opening for discharging combustion gas (gas after combusting the fuel) from the cylinder 34. In addition, an intake port 35 is formed in the cylinder 34. The intake port 35 is an opening for introducing the air into the cylinder 34. An intake manifold 39, which is a flow path of air introduced into the cylinder 34, is connected to the intake port 35. In addition, the cylinder 34 is provided with an intake valve 37 for opening and closing the intake port 35 and with an exhaust valve 38 for opening and closing the exhaust port 36.

The exhaust gas discharged from the exhaust port 36 is exhausted from the exhaust gas purification device 31 toward the muffler 40 after the PM is caught by the DPF 41. The DPF 41 is clogged when the amount of accumulated PM (PM deposits amount) caught and accumulated increases. Thus, the DPF 41 must be cleaned by combusting the PM as appropriate so that the amount of PM accumulation does not become excessive. The combustion of PM deposited on the DPF 41 is referred to as "DPF cleaning (filter cleaning)". The DPF cleaning is performed by raising the temperature of the DPF 41 to a predetermined temperature or higher to combust and gasify the deposited PM, and thereby discharging the gasified PM into the environment together with the exhaust gas. The DPF cleaning is performed by, for example, the post injection of fuel. The post-injection is an operation that promotes the temperature rising of the DPF 13 by injecting the fuel into the combusted gas. The DPF cleaning may throttle the intake throttle of the prime mover E1 (throttling of the intake throttle) to increase the exhaust gas temperature, thereby combusting the PM, for example. In addition to the DPF 41, the exhaust gas purification device 31 may include an oxidation catalyst for oxidizing the fuel in the PM and the nitrogen oxide in the combustion gas, which is not shown in the drawings.

The working machine 1 (the exhaust gas purification device 31) can perform "automatic cleaning" and "manual cleaning" as the DPF cleaning. In addition, the working machine 1 (the exhaust gas purification device 31) is capable of performing "assist cleaning" separately from the "automatic cleaning" and the "manual cleaning".

The DPF cleaning will be described below with reference to FIG. 2

Figure 2:
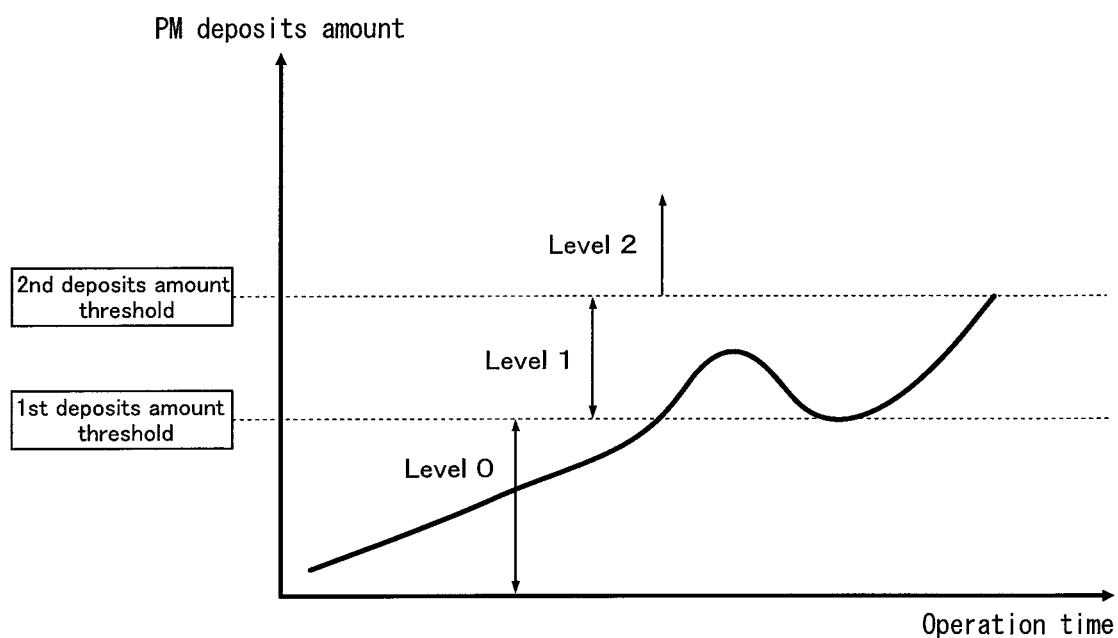
FIG. 2 is a graph showing an example of change of a PM deposits amount with respect to an elapsed time according to the first embodiment.

FIG. 2 is a graph showing an example of change in the PM deposits amount with respect to the operation time (elapsed time), in which the horizontal axis indicates the operation time and the vertical axis indicates the PM deposits amount. FIG. 2 assumes a case where the PM deposits amount gradually increases immediately after the start of the prime mover E1.

In FIG. 2, the first deposits amount threshold is a threshold serving as a boundary for judging whether or not the DPF cleaning is required (for example, the PM deposits amount reaches about 40% of the DPF 41 capacity). The level (level 0) in which the PM deposition amount is less than the first deposition amount threshold is a level that does not require the DPF cleaning.

When the PM deposits amount is equal to or larger than the first deposits amount threshold, the automatic cleaning, which is the DPF cleaning that automatically combusts the PM, is performed. That is, the automatic cleaning is performed at a level (level 1) in which the PM deposits amount is equal to or higher than the first deposits amount threshold and is less than the second deposits amount threshold that is larger than the first deposits amount threshold. The automatic cleaning is the DPF cleaning that is automatically performed, and the post-injection, the throttling, and the like are automatically performed regardless of the operator's intention, and thereby the exhaust temperature rises.

When the PM deposits amount is equal to or larger than the second deposits amount threshold value, the DPF cleaning (the manual cleaning) for combusting the PM can be performed in accordance with the intention of the operator who operates the working machine 1. The second deposits amount threshold value is a threshold value for judging whether or not to allow the operator to perform the manual cleaning (for example, the PM deposits amount is about 60% of the DPF 41 capacity). That is, the manual cleaning is a cleaning operation that is performed at the intension of the operator, and is the DPF cleaning that can be performed at a level (level 2) where the PM deposits amount is equal to or larger than the second deposits amount threshold.

In the manual cleaning, a processing for increasing the exhaust temperature is performed with the post injection, the throttling, or the like. Thus, the manual cleaning is performed under a predetermined condition. In other words, the manual cleaning cannot be performed unless the predetermined condition is satisfied. The predetermined condition is that at least the working machine 1 is parked. The conditions for confirming the parking of the working machine 1 are, for example, that the traveling operation member is neutral, the prime mover E1 is in an idling state, and a parking brake is in a braking (locked) state when the working machine 1 is equipped with the parking brake, for example.

The assist cleaning is the DPF cleaning that is different from the manual cleaning described above, and is the DPF cleaning that is executed when the PM deposits amount is equal to or larger than the first deposits amount threshold. This assist cleaning is the DPF cleaning that can be performed manually at level 1 where the PM deposition amount is equal to or higher than the first deposition amount threshold and less than the second deposition amount threshold. The manual cleaning mentioned above is the DPF cleaning to be performed by an operator who operates the working machine 1 (performed after parking the working machine 1 in the middle of use), whereas the assist cleaning is provided for being performed for simple maintenance after the use of the working machine 1 or before the use by a person other than the operator (for example, a manager of the working machine 1, the rental company). Also in this assist cleaning, the engine speed is forcibly increased, and is performed under the predetermined conditions described above.

The automatic cleaning, the manual cleaning, and the assist cleaning are terminated after performing the DPF cleaning for a predetermined time, for example. The operation time of the DPF cleaning may vary depending on the PM deposits amount or the PM combustion amount. Note that a plurality of deposition amount threshold values larger than the second deposition amount threshold value may be provided as the deposition amount threshold value. The plurality of deposits amount threshold values are, for example, a threshold value that strongly requires the manual cleaning, a threshold value that requires the maintenance work in a maintenance factory, and the like.

The above-described manual cleaning is executed by turning on a manual switch installed in the steering portion 24, that is, by turning on a second manual switch 58 provided on the display device 29 and configured to be switched on/off as shown in FIG. 3. The second manual switch 58 has a lamp such as an LED, and the lamp provided on the second manual switch 58 can be turned on, turned off, and blinked. For example, the lamp of the second manual switch 58 is extinguished when the PM deposits amount is in level 0 and in level 1, and blinks when the PM deposits amount becomes level 2, thereby prompting the operator to perform the manual cleaning. When the second manual switch 58 is turned on while the lamp of the second manual switch 58 is blinking, a second command signal to be described later is sent to the cleaning controller device 33, and then the lamp is switched from the blinking state to the lighting state. When the manual cleaning is finished and the PM deposits amount becomes less than level 2, the lamp of the second manual switch 58 is extinguished.

In addition, in the assist cleaning can be executed by turning on the manual switch, unlike the second manual switch 58, installed at a position different from the steering portion 24, that is, by turning on the first manual switch 55 configured to be switched between ON and OFF as shown in FIG. 17.

The first manual switch 55 is, for example, a push button type switch, a seesaw type switch, or the like, and can be switched ON or OFF in a single action. When the first manual switch 55 is the push button type switch, the first manual switch 55 is turned ON when pressed once, and turned OFF when pressed again from the ON state. in addition, when the first manual switch 55 is the seesaw type switch, the first manual switch 55 is turned ON when a location corresponding to ON is pressed, and is turned OFF when a location corresponding to OFF is pressed. That is, the first manual switch 55 can be switched ON or OFF in a single action.

In the above-described embodiment, the first manual switch 55 can be switched ON or OFF in a single action, but may be configured to be switched from OFF to ON in at least two actions (the assist cleaning is ordered from the state where the assist cleaning is not ordered). For example, the first manual switch 55 may be a switch that combines a slide type and a push button type, which is turned from OFF to ON when a slide operation and a push operation are performed. Alternatively, the first manual switch 55 may be a push button type switch that turns from OFF to ON when the push operation is performed at least twice, or may be a switch that combines a push button type and a rotary operation type (a rotation operation type) such as a rotary, which turns from OFF to ON when the rotary operation and the push operation are performed, and thus a method of switching that requires at least two actions is not limited thereto.

In addition, the first manual switch 55 may have a lamp such as an LED. In this case, the lamp provided in the first manual switch 55 can be turned on, turned off, and blinked.

As a place where the first manual switch 55 is arranged, a position that cannot be seen from an operator seated on the operator seat 6 or a position that is operated while getting off the working machine 1 can be considered. For example, the first manual switch 55 is provided inside the cover device such as the bonnet 11, the side cover 22, the hood 23, and the swivel cover described above. In this embodiment, as shown in FIG. 17, the first manual switch 55 is provided inside the bonnet 11. That is, the first manual switch 55 is attached to the support frame 12 inside the bonnet 11. When the first manual switch 55 is provided inside the bonnet 11, the first manual switch 55 may be arranged anywhere inside the bonnet 11, but it is preferred to be easily accessible under the state where the opening/closing cover 11a is opened (for example, in the vicinity of the opening/closing cover 11a inside the hood 11). The first manual switch 55 may be provided at a site other than the inside of the bonnet 11.

In addition, also when the first manual switch 55 is provided in the inside of the side cover 22, it is preferable to provide the first manual switch 55 in the easily accessible site (for example, in the vicinity of the hood 23 inside the side cover 22). In this case, the first manual switch 55 is preferably provided closer to the machine outward side (the right side in the drawings).

In addition, as shown in FIG. 18, the first manual switch 55 may be provided inside the turn cover 21. For example, the first manual switch 55 may be provided inside the opening/closing lid 57 provided on the side of the turn cover 21. The opening/closing lid 57 is a lid that closes an opening provided in the revolving cover 21 so as to be openable and closable. The opening/closing lid 57 is a lid for closing an inspection opening for inspecting equipment inside the machine body 2, or the opening/closing lid 57 is a lid for closing an opening for putting a tool into and out of a tool storage portion provided inside the machine body 2.

In addition, the first manual switch 55 is provided inside a cylindrical column that constitutes the cabin 5, a lid that can be opened and closed is provided on the outer surface of the column (the surface outside the cabin 5), and then the first manual switch 55 may be accessible from the outer side of the cabin 5 (from the outside of the cabin 5) when the cabin is opened by opening the lid. In the state where the lid is closed, the first manual switch 55 cannot be visually recognized and cannot be operated. In other words, the first manual switch 55 may be provided inside the column of the cabin 5 (the space surrounded by the column) which is a position different from the steering portion 24.

Note that the display device 29 or the steering portion 24 may be provided with a permission switch 59 and a cleaning lamp 60. The permission switch 59 is a switch configured to be switched between ON and OFF. The permission switch 59 has a lamp such as an LED, and the lamp can be turned on and off. The cleaning lamp 60 is turned off when the DPF cleaning is not performed, and is turned on when any of the automatic cleaning, the manual cleaning, and the assist cleaning is performed.

As shown in FIG. 1, the exhaust gas purification device 31 includes a first pressure sensor 42, a second pressure sensor 43, and a differential pressure sensor 44. The first pressure sensor 42 detects the exhaust pressure near the inlet of the DPF 41 on the inlet side of the DPF 41 (on the inlet side of exhaust gas). The second pressure sensor 43 detects the exhaust pressure in the vicinity of the outlet of the DPF 41 on the outlet side of the DPF 41 (on the outlet side of exhaust gas). The first pressure sensor 42 and the second pressure sensor 43 are pressure sensors constituted of, for example, piezoelectric elements. The first pressure sensor 42 and the second pressure sensor 43 are connected to the differential pressure sensor 44.

The differential pressure sensor 44 detects the difference (differential pressure) of the exhaust pressure between the inlet side and the outlet side of the DPF 41 on the basis of the exhaust pressure detected by the first pressure sensor 42 and the exhaust pressure detected by the second pressure sensor 43. When there is no PM accumulation and no clogging in the DPF 41, the pressure loss due to the DPF 41 is very small. And, the difference between the exhaust pressures detected by the first pressure sensor 42 and the second pressure sensor 43 is very small. Thus, the differential pressure detected by the differential pressure sensor 44 is also small. However, when the PM accumulates in the DPF 41 and the degree of clogging increases, the pressure loss due to the DPF 41 increases, so the differential pressure detected by the differential pressure sensor 44 also increases. Since the magnitude of the differential pressure corresponds to the degree of clogging of the DPF 41, the magnitude of the differential pressure can be converted into the degree of clogging of the DPF 41, that is, the PM deposits amount in the DPF 41. Thus, the PM deposits amount can be calculated based on the first pressure sensor 42, the second pressure sensor 43, and the differential pressure sensor 44.

In addition, the exhaust gas purification device 31 has a measurement device (a temperature sensor) 45. The temperature sensor 45 is provided in the exhaust manifold 30 that connects the prime mover E1 and the DPF 41, and detects the temperature (an exhaust temperature) of the combustion gas that is discharged from the prime mover E1 and flows toward the DPF 41. The temperature sensor 45 is constituted of, for example, a thermistor.

The exhaust gas purification device 31 has a cleaning controller device 33. The differential pressure sensor 44 and the temperature sensor 45 are connected to the cleaning controller device 33. The cleaning controller device 33 receives the differential pressure detected by the differential pressure sensor 44 and receives the exhaust temperature detected by the temperature sensor 45. The cleaning controller device 33 is connected to an engine controller device 32 that controls the prime mover E1. In other words, the working machine 1 is provided with a controller device 46 including the cleaning controller device 33 and the engine controller device 32. In addition, the display device 29 and the first manual switch 55 are connected to the cleaning controller device 33. That is, the cleaning controller device 33 obtains command signals from the first manual switch 55 and the second manual switch 58.

The engine controller device 32 is constituted of a CPU or the like. The engine controller device 32 obtains information from the sensors installed at various locations of the prime mover E1 and the power transmission system, calculates the optimal fuel injection amount, the injection timing, the ignition timing, the idling speed, and the like according to the state of the prime mover E1, and then outputs a control command to the prime mover E1 and the like. For example, when the accelerator provided around the operator seat 6 is operated (by performing the accelerator operation), the engine controller device 32 detects the operation amount (an opening) of the accelerator, and then increases the fuel injection amount. In this manner, the engine speed of the prime mover E1 can be increased.

The sensors that provide information to the engine controller device 32 include an acceleration sensor that detects the acceleration degree, a differential pressure sensor 44 that detects the differential pressure of the exhaust gas purification device 31, a temperature sensor 45 that detects the exhaust temperature, an air flow meter that detects the amount of an air intake, a revolving sensor for detecting the revolving speed (an engine speed) of the prime mover E1, a water temperature sensor that detects the coolant temperature, a throttle position sensor that detects the opening of the valve, and the like. In addition to these, there are a cam position sensor that detects the crank position, an oxygen concentration sensor (an 02 sensor) that detects the oxygen concentration in the intake air, and the like.

As shown in FIG. 1, the cleaning controller device 33 is constituted of a CPU and the like, and performs the control relating to the DPF cleaning. The cleaning controller device 33 includes a cleaning controller portion 47, a deposition amount obtaining portion 50, a notifier portion 51, and a timer portion 56. The cleaning controller portion 47, the deposits amount obtaining portion 50, the notifier portion 51, and the timer portion 56 are constituted of electric/electronic components, a computer program stored in the cleaning controller device 33, and the like.

The cleaning controller portion 47 controls the combustion of PM caught by the DPF (filter) 41. The deposits amount obtaining portion 50 obtains the PM deposits amount, and obtains the PM deposits amount by obtaining the differential pressure detected by the differential pressure sensor 44. For example, the deposits amount obtaining portion 50 obtains information such as the differential pressure detected by the differential pressure sensor 44, the exhaust temperature detected by the temperature sensor 45, the coolant temperature, the oxygen concentration in the intake air, and the fuel injection amount, and then calculates and obtains the PM deposition amount. In this embodiment, the differential pressure of the differential pressure sensor 44 is converted into the PM deposition amount. Instead of that, the deposition amount obtaining portion 50 may obtain the PM deposition amount with use of the sensors other than the differential pressure sensor 44, and is not limited by the embodiment described above. The notifier portion 51 notifies the outside or the like that the assist cleaning is possible. The timer portion 56 is constituted of a timer or the like, and counts the elapsed time. The cleaning controller device 33 obtains the command signals from the first manual switch 55 and the second manual switch 58.

The cleaning controller portion 47 includes a first cleaning controller portion 52, a second cleaning controller portion 53, and a third cleaning controller portion 54. The first cleaning controller portion 52, the second cleaning controller portion 53, and the third cleaning controller portion 54 are constituted of the electric/electronic components, the computer programs for the cleaning controller portion 47, and the like.

The first cleaning controller portion 52 outputs a command signal (the first command signal) for performing the automatic cleaning in response to that the PM deposits amount obtained by the deposits amount obtaining portion 50 is equal to or larger than the first deposits amount threshold value. The engine controller device 32 gives a command such as the post injection to the prime mover E1 in response to the first command signal from the first cleaning controller portion 52, and rises the temperature of exhaust gas (the exhaust temperature) with the post injection or the like, for example, to a temperature for combusting the PM, that is, 600° C. or higher. That is, the first cleaning controller portion 52 performs the automatic cleaning when the PM deposits amount caught by the filter 41 is equal to or larger than the first deposits amount threshold.

The second cleaning controller portion 53 outputs a command signal (a second command signal) for performing the manual cleaning to the engine controller device 32 in response to a command from the second manual switch 58 (the manual switch). The engine controller device 32 orders the prime mover E1 to perform the post injection or the like in response to the second command signal from the second cleaning controller portion 53, and thus rises the exhaust gas temperature (the exhaust temperature) to 600° C. or more through the post injection or the like. That is, the second cleaning controller portion 53 performs the manual cleaning in which the PM is combusted in accordance with a command from the second manual switch 58 (the manual switch) when the PM deposits amount is equal to or larger than the second deposits amount threshold (level 2).

The third cleaning controller portion 54 outputs, to the engine controller device 32, a command signal (a third command signal) for performing the assist cleaning in response to a command from the first manual switch 55 (the manual switch). The engine controller device 32 orders the prime mover E1 to perform the post injection and the like in response to the third command signal from the second cleaning controller portion 53, and rises the exhaust gas temperature (the exhaust temperature) to 600° C. or more through the post injection or the like. That is, the third cleaning controller portion 54 performs the assist cleaning in which the PM is combusted in accordance with a command from the first manual switch 55 (the manual switch) when the PM deposits amount is equal to or more than the first deposits amount threshold and smaller than the second deposits amount threshold.

The notifier portion 51 outputs a notification signal notifying that the elapsed time after the automatic cleaning by the first cleaning controller portion 52 is finished is a time threshold or more and notifying that the PM deposition amount is equal to or more than the first deposition amount threshold and smaller than the second deposition amount threshold, to the first manual switch 55, the lamps, and the liquid crystal panel 112. For example, when the assist cleaning is available, the notifier portion 51 outputs a notification signal to the first manual switch 55 to blink the lamp of the first manual switch 55. In this case, for example, when the first manual switch 55 is operated (turned on), the lamp of the first manual switch changes from the blinking state to the lighting state, and when the assist cleaning is finished, the lamp of the first manual switch is turned off.

The timer portion 54 is capable of measuring at least the time related to the DPF cleaning, and is capable of measuring the elapsed time from the end of automatic cleaning, the time during which the automatic cleaning, the manual cleaning, or the assist cleaning is performed, and the like.

Next, a control flow of the DPF cleaning will be described based on the flowchart shown in FIG. 4.

Figure 4:
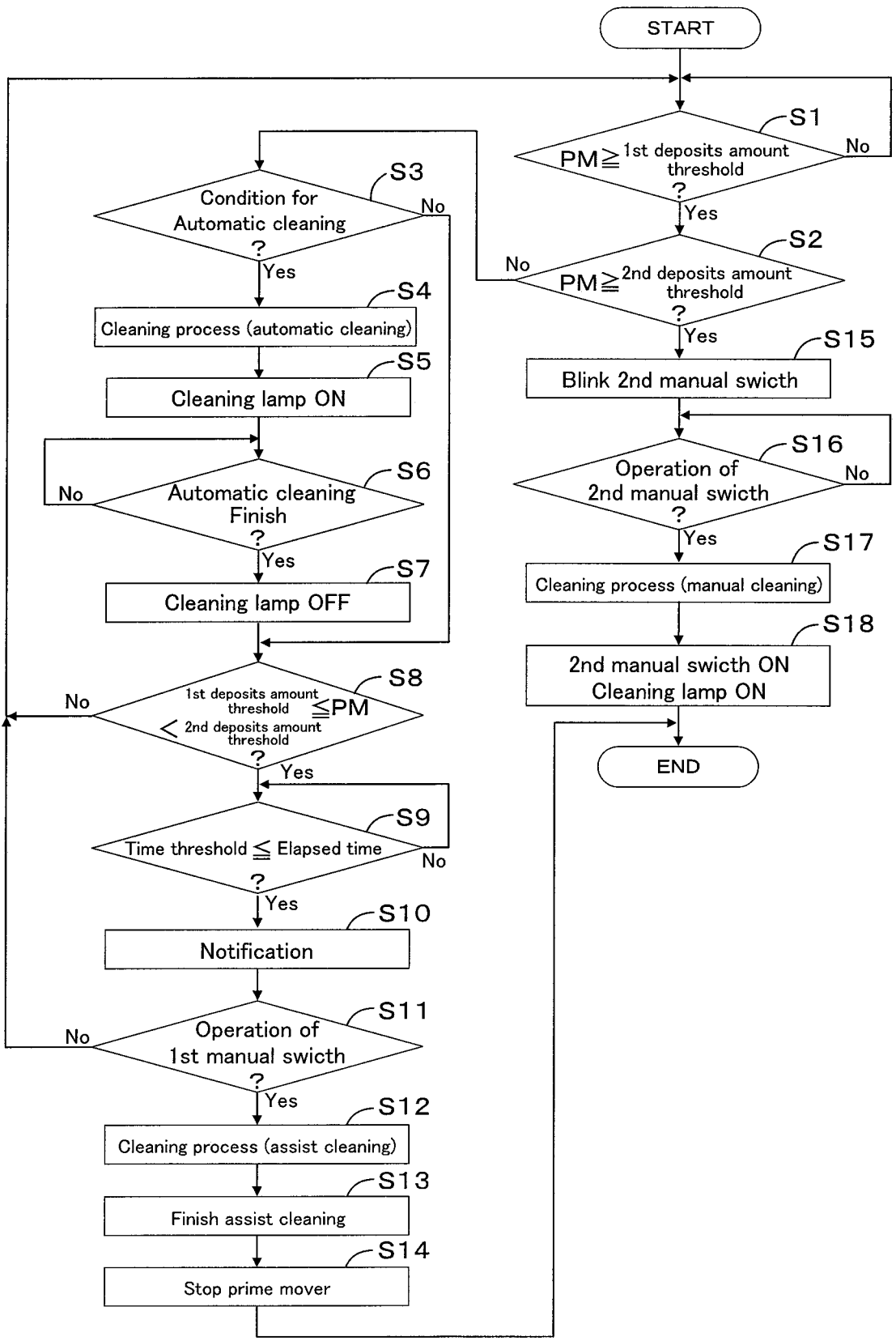
FIG. 4 is a flowchart showing a cleaning operation for a DPF and as antitheft control according to the first embodiment.

As shown in FIG. 4, the cleaning controller device 33 judges whether or not the PM deposits amount is equal to or larger than the first deposits amount threshold (step S1). If the PM deposits amount is equal to or larger than the first deposits amount threshold (step S1: Yes), the cleaning controller device 33 proceeds to step S2, and judges whether or not the PM deposits amount is equal to or larger than the second deposits amount threshold at step S2.

When the cleaning controller device 33 determines that the PM deposits amount is less than the second deposits amount threshold (step S2: No), the cleaning controller device 33 judges whether or not the conditions for the automatic cleaning are satisfied (step S3: judgment of automatic cleaning condition). The conditions for the automatic cleaning are the engine speed, the water temperature, the exhaust temperature at the inlet of the DPF 41, the exhaust temperature at the outlet, and the like. The cleaning controller device 33 determines that the conditions for the automatic cleaning are satisfied, for example, when the engine speed is equal to or higher than a predetermined speed (A1 rpm or higher), when the water temperature is equal to or higher than a predetermined temperature (A2° C. or higher), when the exhaust temperature at the inlet of the DPF 41 is equal to or higher than a predetermined temperature (A3° C. or higher), and when the exhaust gas temperature at the outlet of the DPF 41 is equal to or higher than a predetermined temperature (A4° C. or higher) (step S3, Yes). The engine speed, the water temperature, the exhaust temperature at the inlet of the DPF 41, and the exhaust temperature at the outlet of the DPF 41, which are the conditions of the automatic cleaning, are preliminarily set in the cleaning controller device 33.

In addition, ON/OFF of the permission switch 59 may be employed as the condition of the automatic cleaning. When the permission switch 59 is ON, the automatic cleaning is permitted, and when the permission switch 59 is OFF, the automatic cleaning is not permitted. In this case, at step S3 of the judgment of automatic cleaning condition, when the permission switch 59 is ON, it is determined that the automatic cleaning conditions are satisfied. In addition, the above-described automatic cleaning conditions are merely examples, and the above-described numerical values and items (the engine speed, the water temperature, the exhaust temperature at the inlet of the DPF 41, the exhaust temperature at the outlet of the DPF 41, and ON/OFF of the permission switch 59) are not limited to the examples.

If the conditions for the automatic cleaning are satisfied (step S3, Yes), the PM deposits amount is equal to or larger than the first deposits amount threshold and less than the second deposits amount threshold (level 1), and thus the first cleaning controller portion 52 performs the automatic cleaning. At this time, the cleaning lamp 60 is turned on (step S5).

The cleaning controller device 33 judges whether or not the automatic cleaning has finished (step S6). When the automatic cleaning is finished (step S6: Yes), the cleaning lamp 60 is turned off (step S7). When the automatic cleaning is finished, the timer portion 56 counts an elapsed time after the automatic cleaning is finished.

On the other hand, if the conditions for automatic cleaning are not satisfied (step S3: No), the cleaning controller device 33 judges whether the PM deposits amount is equal to or larger than the first deposits amount threshold and less than the second deposits amount threshold (level 1) (step S8). If the PM deposition amount is less than the first deposition amount threshold (level 0) or is the second deposition amount threshold or more (level 2), the processing returns to step S1 (step S8: No). If it is determined that the PM deposits amount is in level 1 (step S8: Yes), the cleaning controller device 33 judges whether the elapsed time counted by the timer portion 56 (the time elapsed after the finish of the automatic cleaning) is equal to or larger than the time threshold (step S9). If the elapsed time is less than the time threshold (step S8: No), the cleaning controller device 33 returns and does not proceed to the next process. At this time, the assist cleaning is not performed even if the first manual switch 55 is operated. That is, the assist cleaning is not performed unless a predetermined time has elapsed after the automatic cleaning is finished. This prevents the oil dilution caused when the DPF cleaning is repeated frequently (dilution of engine oil caused when the post-injection fuel adhering to the cylinder inner wall of the prime mover E1 falls into the oil pan and entering the engine oil).

When a predetermined time has elapsed after the automatic cleaning is finished (step S9: Yes), that is, when it is determined that the PM deposits amount is in level 1 (step S9: Yes), the notifier portion 51 notifies the PM deposits amount is in level 1 (step S10). In this manner, the operator is informed that a predetermined time has elapsed after the finish of the automatic cleaning and further the PM deposits amount is in level 1, that is, that the assist cleaning is available.

In a state where the notifier portion 51 notifies that assist cleaning is available, the cleaning controller device 33 judges whether or not the first manual switch 55 is operated (whether the first manual switch 55 has been switched from OFF to ON) (step S11). If the first manual switch 55 is OFF, the process returns to step S1 (step S11: No). If the first manual switch 55 is ON (step S11: Yes), a command signal is sent from the first manual switch 55 to the cleaning controller portion 47, and the assist cleaning is performed by the third cleaning controller portion 54 (step S12). While the assist cleaning is being performed, the cleaning lamp 60 is turned on. For example, the third cleaning controller portion 54 finishes the assist cleaning when the PM deposits amount is less than the first deposits amount threshold, that is, in level 0. When the assist cleaning is finished (step S13), the cleaning lamp 60 is turned off, and the third cleaning controller portion 54 outputs a stop signal to the engine controller device 32, and the third cleaning controller portion 54 stops the driving of the prime mover E1 through the engine controller device 32 (step S14).

On the other hand, if the cleaning controller device 33 determines that the PM deposits amount is equal to or larger than the second deposits amount threshold (level 2) (step S2: Yes), the cleaning controller device 33 blinks the second manual switch 58 (step S15). It is judged whether or not the second manual switch 58 has been operated (whether or not the second manual switch 55 has been switched from OFF to ON) (step S16).

If the second manual switch 58 is not operated, the process returns and does not proceed to next process (step S16: No). When the second manual switch 58 is ON (step S16: Yes), a command signal is sent from the second manual switch 58 to the cleaning controller portion 47, and the manual cleaning is performed by the second cleaning controller portion 53 (step S17). The manual cleaning is permitted when a predetermined condition is satisfied, and the manual cleaning is not performed when the predetermined condition is not satisfied. When the manual cleaning is being performed, the second manual switch 58 is turned on and the cleaning lamp 60 is turned on (step S18). When the manual cleaning is finished, the second manual switch 58 and the cleaning lamp 60 are turned off. In the above-described embodiment, the automatic cleaning is performed in level 1, but the automatic cleaning may be performed in level 2.

With the above flow, the automatic cleaning, the manual cleaning, and the assist cleaning can be performed. In particular, In the automatic cleaning and the manual cleaning, the DPF cleaning can be performed under the state where the working machine 1 is being driven (such as the situation where the working is performed by the working device 4 of the working machine 1), that is, under the state where the working machine 1 is being rented to a user or the like.

On the other hand, when the rented working machine 1 is returned, the manager or the like of the rental company presses the first manual switch 55 before the working machine 1 is rented again, and thereby the assist cleaning is performed. If the assist cleaning is performed, the working machine 1 can be lent out in the state where the PM deposits amount is in level 0. In addition, the working machine 1 can be stored in the state where the PM deposits amount is in level 0. In particular, in the conventional working machine 1, when the working machine 1 is returned to the rental company under the state where the PM deposit amount is in level 1 or higher, the conventional working machine 1 cannot be lent preliminarily reducing the PM deposits amount to level 0 before the lending out. However, by performing the assist cleaning, the working machine 1 can be lent preliminarily reducing the PM deposits amount to level 0.

Next, a modified example of the first manual switch 55 will be described below with reference to FIG. 5 and FIG. 6.

Figure 5:
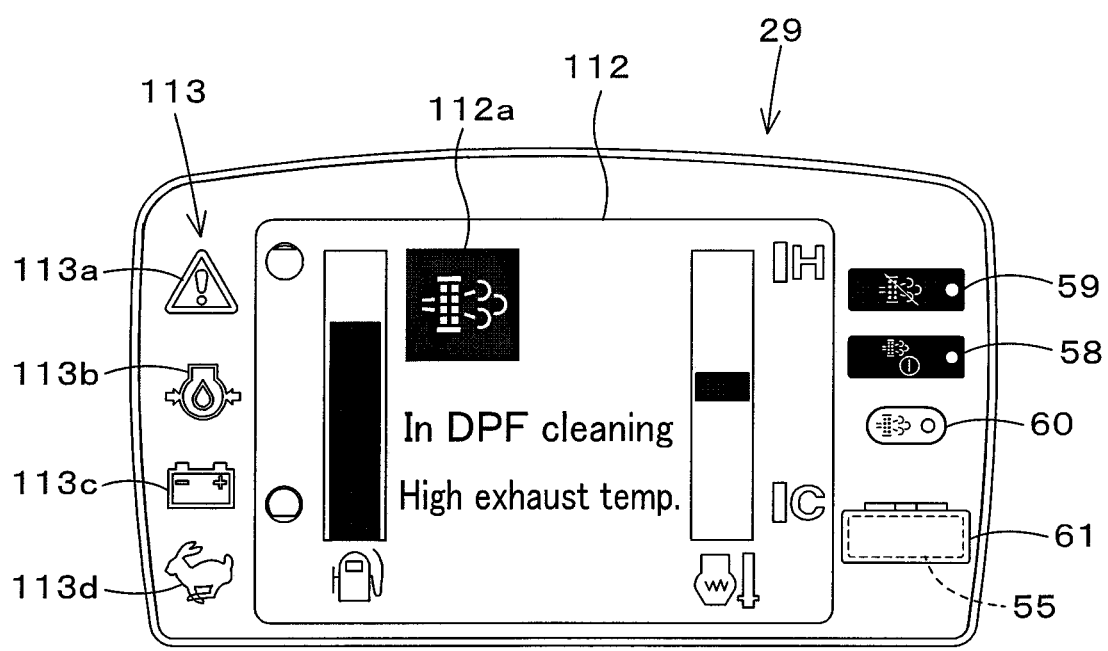
FIG. 5 is a view illustrating another display device according to the first embodiment.
Figure 6:
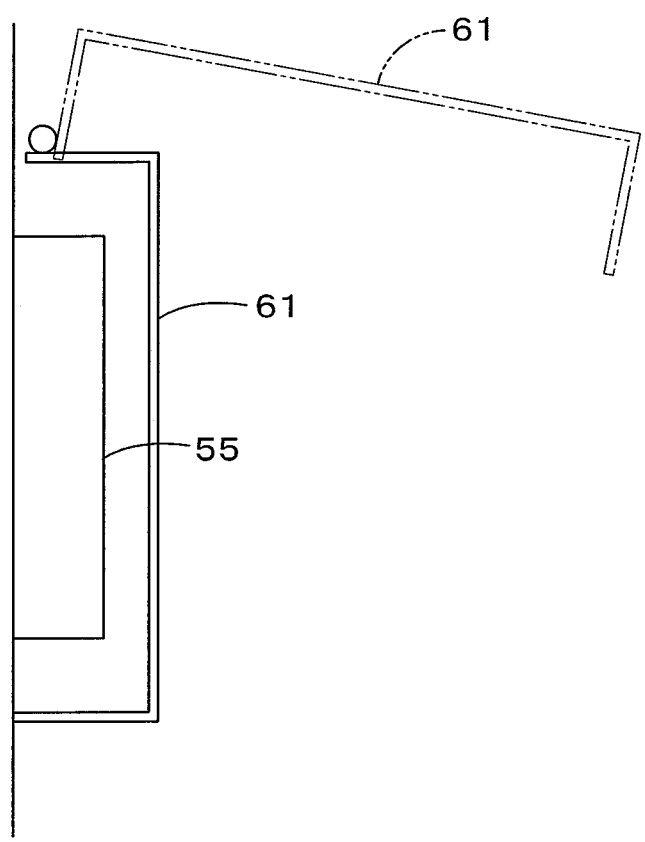
FIG. 6 is a cross-section view of a second manual switch and a cover according to the first embodiment.

As shown in FIG. 5, the modified example shows a case where the first manual switch 55 is provided in the steering portion 24. The first manual switch 55 is provided on the display device 29 of the steering portion 24. In addition, the first manual switch 55 is covered with a cover (a covering member) 61 that can be opened and closed. The cover 61 is formed of an opaque material. When the cover 61 is closed, the operator cannot visually recognize the first manual switch 55, and when the cover 61 is opened as shown in FIG. 6, the operator can visually recognize the first manual switch 55. In FIG. 5 and FIG. 6, the cover 61 is a blindfold member that can be opened and closed and hides the first manual switch 55.

The cover (the covering member) 61 may be formed of a transparent or translucent material so that the operator can visually recognize the cover 61 with the cover 61 closed but cannot operate unless the cover 61 is opened. That is, as described above, the first manual switch 55 is not a switch for being operated by the operator seated on the operator seat 6, and therefore the first manual switch 55 is provided with a cover 61 that covers whole of the first manual switch 55 from the outside. In this manner, a restriction is provided on the operation of the first manual switch 55. In this modified example, the first manual switch 55 with the cover 61 may be provided anywhere on the steering portion 24.

According to the above description, the working machine 1 includes the manual switch, the filter 41 to catch particulate matters (PM) included in the exhaust gas that is exhausted from the prime mover E1, the first cleaning controller portion 52 to perform the automatic cleaning that automatically combusts the particulate matters when the deposits amount of the particulate matters caught by the filter 41 is the first deposits amount threshold or more, the second cleaning controller portion 53 to perform the manual cleaning that combusts the particulate matters based on the command of the manual switch when the deposits amount is equal to or more than the second deposits amount threshold that is larger than the first deposits amount threshold, and the third cleaning controller portion 54 to perform the assist cleaning that combusts the particulate matters based on the command of the manual switch when the deposits amount is equal to or more than the first deposits amount threshold and smaller than the second deposits amount threshold. According to that configuration, when the PM deposits amount is equal to or more than the first deposits amount threshold and less than the second deposits amount threshold value, the assist cleaning for combusting the PM can be performed by the manual operation.

The third cleaning controller portion 54 performs the assist cleaning when a predetermined time has elapsed after the first cleaning controller portion 52 stops the automatic cleaning. According to that configuration, it is possible to suppress repeating the filter cleaning (the DPF cleaning) in a short time, and thus it is possible to prevent the oil dilution.

In addition, the third cleaning controller portion 54 performs the assist cleaning when obtaining the command of the manual switch after when a predetermined time has elapsed after the first cleaning controller portion 52 stops the automatic cleaning. According to that configuration, it is possible to prevent the assist cleaning from starting unexpectedly. In other words, if the manual cleaning is operated after the automatic cleaning is finished and then the elapsed time exceeds the time threshold, the assist cleaning is started unexpectedly. The unexpected assist cleaning can be prevented.

In addition, the working machine 1 includes a notifier portion 51 to notify that the predetermined time has elapsed after the first cleaning controller portion 52 stops the automatic cleaning and that the deposits amount is equal to or more than the first deposits amount threshold and smaller than the second deposits amount threshold. According to that configuration, it is possible to notify the outside that the assist cleaning is available.

In addition, the manual switch includes the first manual switch 55 to command the assist cleaning, and includes the second manual switch 58 to command the manual cleaning. According to that configuration, the assist cleaning and the manual cleaning can be easily distinguished by separating the switch for performing the assist cleaning from the switch for performing the manual cleaning.

In addition, the third cleaning controller portion 54 stops the prime mover E1 after stopping the assist cleaning. According to that configuration, since the driving of the prime mover E1 is automatically stopped after the assist cleaning is finished, it is not necessary to stop the prime mover E1 after the assist cleaning is finished, which is convenient.

In addition, the working machine 1 includes the first manual switch 55 that is provided at a position different from the steering portion 24 and orders the combustion of the particulate matter. According to that configuration, the manager of the working machine 1 such as a rental company can perform the DPF cleaning before lending the working machine 1 in the manual operation. In addition, the first manual switch 55 can be prevented from being operated by an operator who operates the working machine 1.

The first manual switch 55 is arranged in the cover device such as the bonnet 11. According to that configuration, it is possible to prevent the operator from operating the first manual switch 55 during the operation, and only the manager of the working machine 1 such as the rental company can perform the DPF cleaning.

In addition, the working machine 1 includes the second manual switch 58 provided in the steering portion 24 and configured to order the cleaning controller portion 47 to combust the particulate matter. In addition, the cleaning controller portion 47 performs the assist cleaning for combusting the particulate matter when the deposits amount of the particulate matter caught by the filter 41 is equal to or larger than the first deposits amount threshold, and performs the manual cleaning for combusting the particulate matter when the deposits amount of the particulate matter caught by the filter 41 is equal to or larger than the second deposits amount threshold. The first manual switch 55 is a switch for instructing the cleaning controller portion 47 to perform the assist cleaning. The second manual switch 58 is a switch for instructing the cleaning controller portion 47 to perform the manual cleaning. According to that configuration, the operator operating the working machine 1 can execute the DPF cleaning with use of the second manual switch 58, and the manager such as a rental company can execute the DPF cleaning with use of the first manual switch 58.

The first manual switch 55 is covered with a cover member (the cover 61) that can be opened and closed. In addition, the covering member is formed of a blind member that hides the first manual switch 55. According to that configuration, the manager of the working machine 1 such as a rental company can perform the DPF cleaning before lending the working machine 1 in the manual operation. In addition, the first manual switch 55 can be prevented from being operated by an operator who operates the working machine 1.

Second Embodiment

FIG. 7 to FIG. 10 show a second embodiment of the present invention. In the first embodiment described above, the assist cleaning can be executed by providing the first manual switch 55 on the working machine. However, in the second embodiment, the assist cleaning is performed when the rental management information for managing at least rental of the working machine is inputted to the working machine. In the second embodiment, the description of the configurations same as in the first embodiment will be omitted, and different configurations will be described. In the second embodiment, the description will be made assuming that the first manual switch 55 (the assist cleaning switch) is not provided in the working machine 1.

Figure 7:
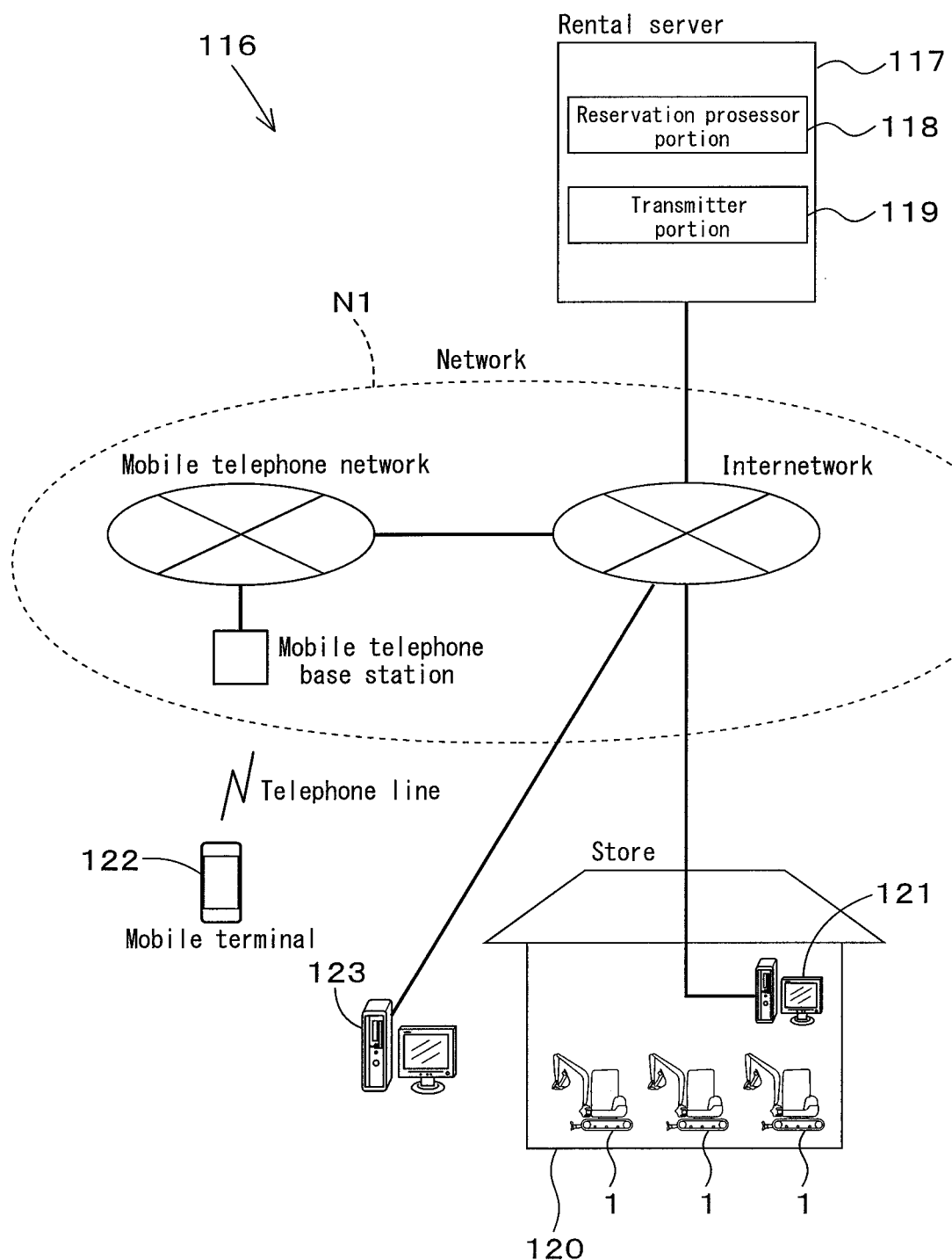
FIG. 7 is a view showing a rental system for a working machine according to a second embodiment of the present invention.

FIG. 7 shows the rental system 116 of the working machine 1. As shown in FIG. 7, the rental system includes a server 117 that manages the rental status of the working machine 1. The server 117 is installed in a rental company of the working machine 1, the rental company having purchased or borrowed the working machine 1 for rental purposes from a seller such as a dealer or a manufacturing company. The rental company has a store 120 (a storage location) where the working machine 1 is stored. A store terminal 121 that is capable of being connected to the server 117 is installed in the store 120. The store terminal 121 is a personal computer.

User terminals 122 and 123 can be connected to the server 117 through the network N1. The user terminal 122 is a mobile terminal that the user can carry. The mobile terminal is constituted of, for example, a smart phone (a multi-function mobile phone) or a tablet PC having a relatively high computing ability. In addition, the user terminal 123 is a personal computer or the like installed at the user's home.

The server 117 includes a reservation processor portion 118 and a transmitter portion 119. The reservation processor portion 118 and the transmitter portion 119 are constituted of electric/electronic components provided in the server 117, computer programs stored in the server 117, and the like. The reservation processor portion 118 processes the reservation request transmitted from the user terminals 122 and 123 through the network N1. That is, the reservation processor portion 118 selects a free working machine 1 based on the requested rental model and the requested rental period transmitted from the user terminals 122 and 123 and the like to the server 117.

When the user approves that the selected working machine 1 is reserved, the transmitter portion 119 transmits information on the rental reservation (the rental information) to the store terminal 121 through the network N. In addition, the transmitter portion 119 transmits the rental information to the user terminals 122 and 123 through the network N. The rental information transmitted from the transmitter portion 119 is stored in the store terminal 121 and the user terminals 122 and 123, respectively. The rental information is, for example, a rental period of the working machine (a lending date, a return date, store information, user information, machine information). The store information is information for specifying a store, such as a store name, a store management number, and a store address. The user information is information for identifying the user, such as the name, sex, age, address, telephone number, mail address, and the like of the lender (the reserving person). The machine information is information for identifying the machine, and includes a machine type, a model, a management number, a manufacturing number, and the like assigned to the working machine.

Figure 8:
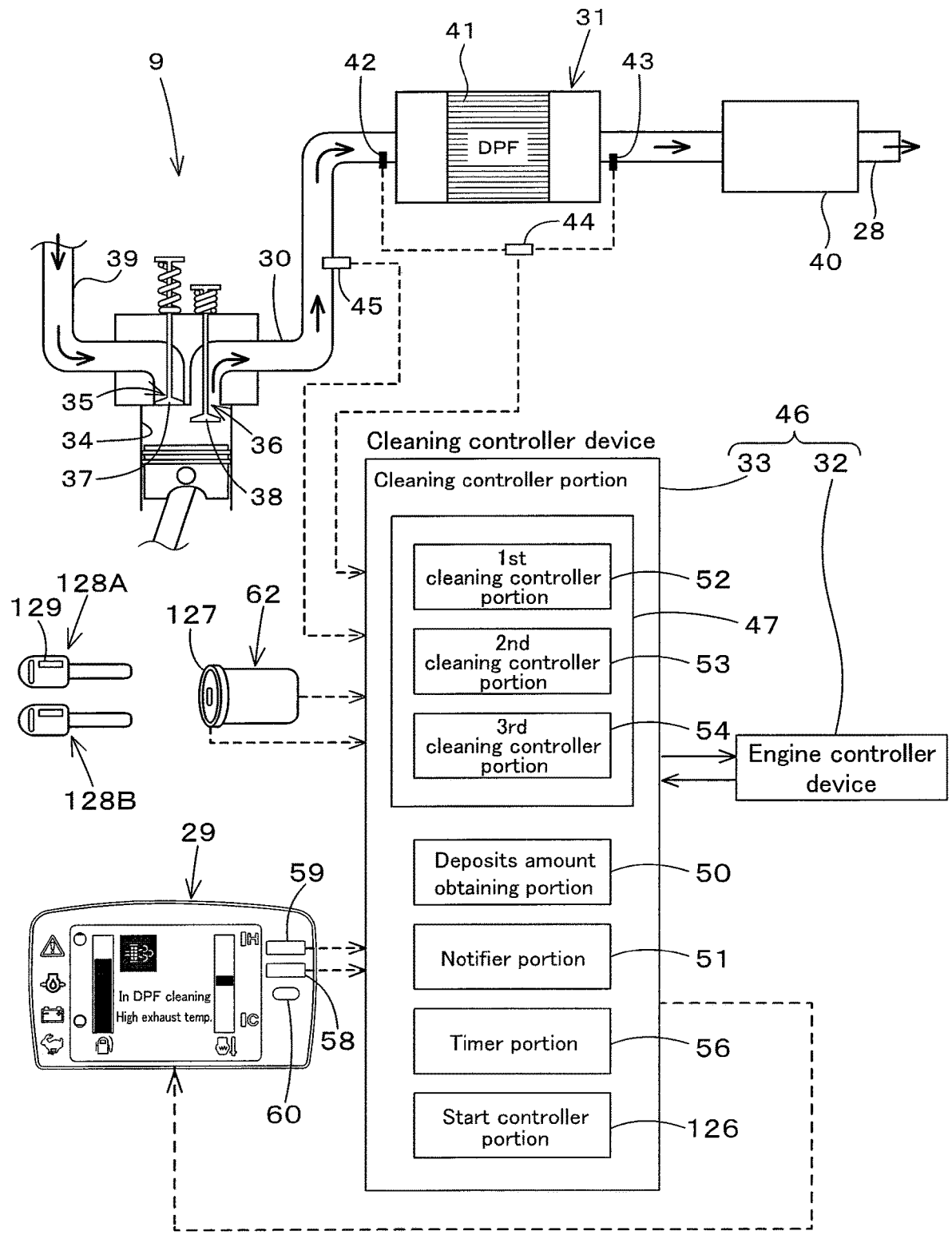
FIG. 8 is a view illustrating structures of an exhaust system and a control system according to the second embodiment.

Now, since the working machine is rented to various users, the working machine is provided with an antitheft device (a starting check device). As shown in FIG. 8, the antitheft device includes keys (ignition keys) 128A and 128B, a key cylinder 62 having an antenna 127, and a start controller portion 126.

The key (a management key) 128A is a key managed by the rental company and stored in the store, and is a key dedicated to management. The management key 128A is a key used not by the user but by the rental company for operating the plurality of working machines 1 managed by the rental company. For example, the management key 128A is a key used when a manager of the rental company operates the working machine 1 for maintenance or the like before the working machine is lent or after the working machine is returned.

The key (a user key) 128B is a key held by the user who lends the working machine from the rental company, and is a key dedicated to the user. The user key 128B can be used for one specific working machine 1, and cannot be used other working machine other than the specific working machine 1. Transponder chips 129A and 129B are embedded in the management key 128A and in the user key 128B, respectively. First start information is stored in each of the transponder chips 129A and 129B. For example, the first start information of the management key is numerals "9670", the first start information of the user key is numerals "1020", and the first start information of the management key is different from the first start information of the user key. For convenience of the explanation, in the following explanation, the management key 128A and the user key 128B may be simply referred to as keys 128A and 128B, respectively.

The start controller portion 126 is constituted of electrical/ electronic components provided in the engine controller device 32, a computer program stored in the engine controller device 32, and the like. The start controller portion 126 determines to allow the prime mover E1 to be started by the keys 128A and 128B when the collation between the first start information stored in the keys 128A and 128B and the second start information stored in the engine controller device 32 is established. When the start controller portion 126 permits the start-up of the prime mover E1 (a start-up permission), the engine controller device 32 ignites the ignition device of the prime mover E1 and starts the prime mover E1 by injecting fuel from the fuel injection device. Note that the start controller portion 126 does not permit the start of the prime mover E1 with the keys 128A and 128B when the collation between the first start information and the second start information of the keys 128A and 128B are not established.

The cleaning controller device 33 includes a first cleaning controller portion 52, a second cleaning controller portion 53, and a third cleaning controller portion 54. The first cleaning controller portion 52 and the second cleaning controller portion 53 are the same as those in the first embodiment.

Figure 9:
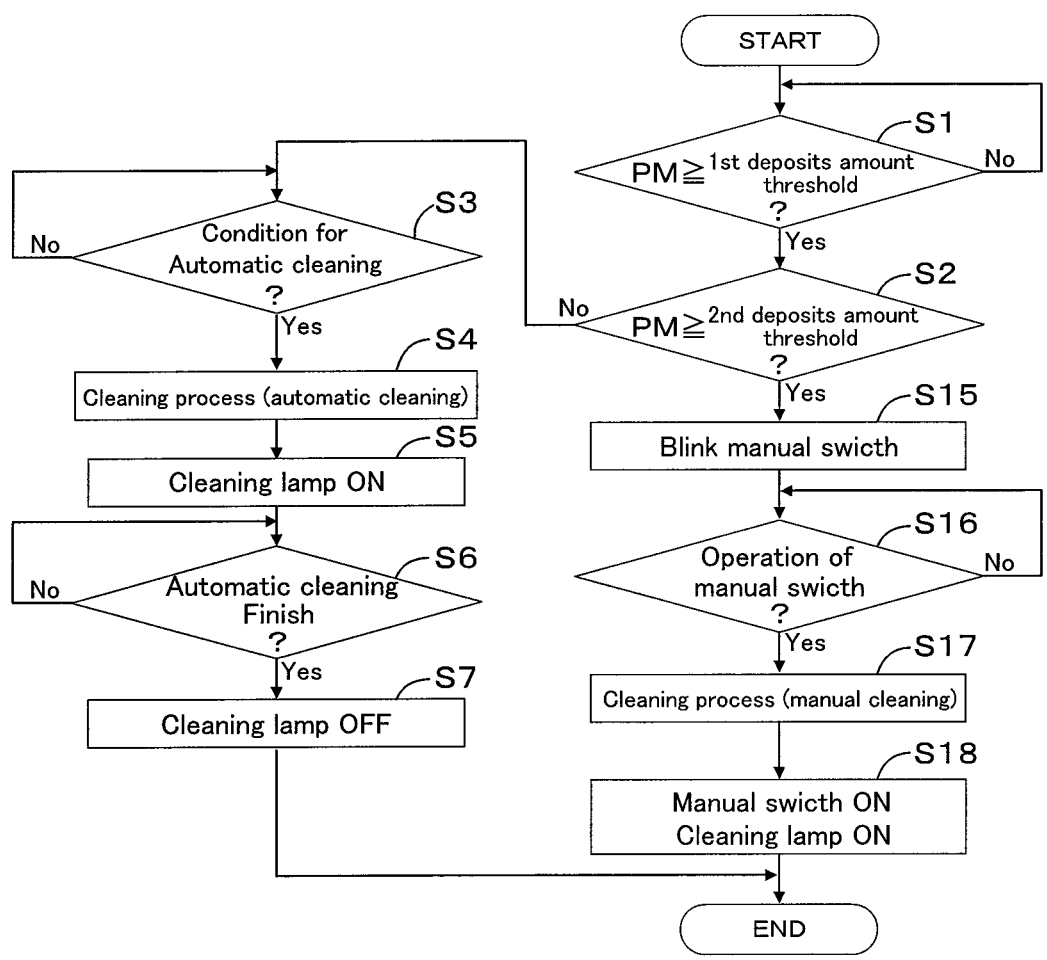
FIG. 9 is a flowchart showing processes of automatic cleaning and manual cleaning according to the second embodiment.

FIG. 9 is a flowchart illustrating the flow of control for the automatic cleaning and the manual cleaning. Steps S1 to S7 in FIG. 9 are the same as those in FIG. 4. Steps S15 to S18 are the same as in FIG. 9 are the same as those in FIG. 4. As shown in FIG. 9, when the PM deposits amount is equal to or larger than the first deposits amount threshold and less than the second deposits amount threshold (level 1), the first cleaning controller portion 52 performs the automatic cleaning (step S5). In addition, when the second manual switch 58 is ON (step S16: Yes), the second cleaning controller portion 53 performs the manual cleaning (step S17).

When the rental management information is input to the cleaning controller device 33, the third cleaning controller portion 54 outputs, to the engine controller device 32, a command signal (a third command signal) for performing the assist cleaning, and thereby performs the assist cleaning.

The rental management information is information managed by the rental company or the like, and is information inputted to the working machine 1 before or after the rental of the rented working machine 1. In other words, the rental management information is information that is distinguished from information inputted while the working machine is rented to the user. In this embodiment, the rental management information is the first start information stored in the management key 128A, and the key cylinder 62 is an obtaining device configured to obtain the rental management information. Thus, the third cleaning controller portion 54 outputs a command signal (a third command signal) for performing the assist cleaning to the engine controller device 32 when the management key 128A is inserted into the key cylinder (the obtaining device) 62 and then the key cylinder (the obtaining device) 62 obtains the first start information (the rental management information).

Figure 10:
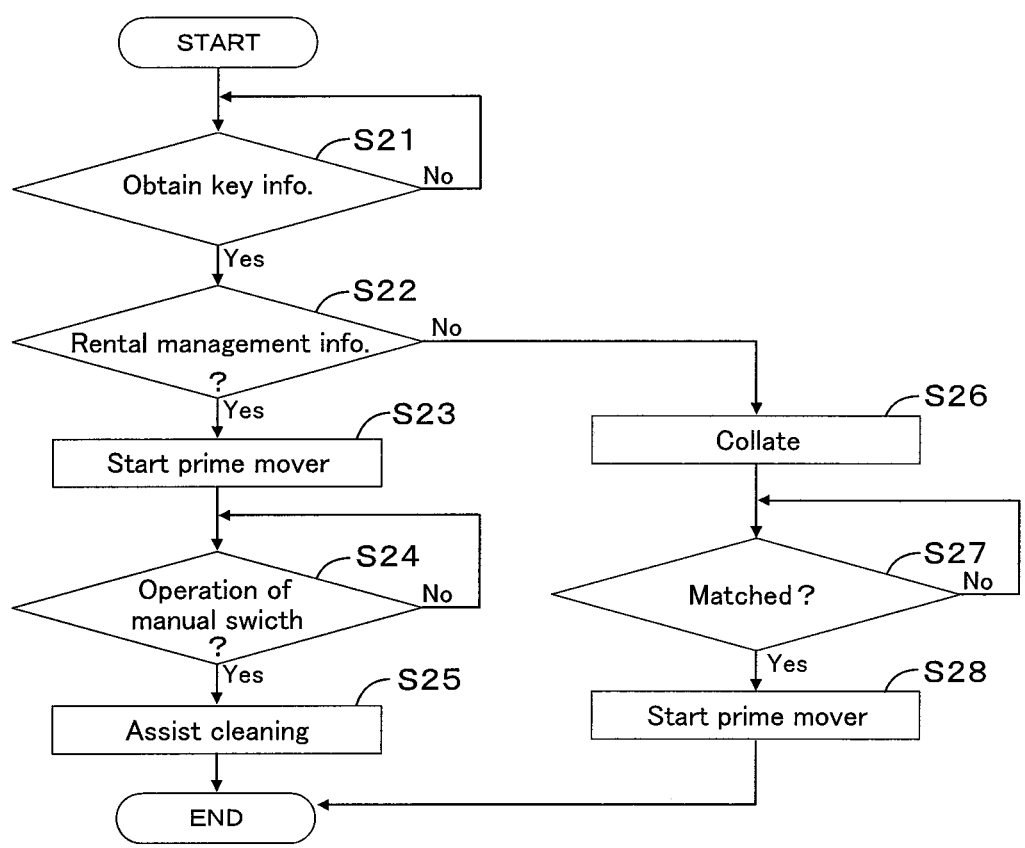
FIG. 10 is a flowchart showing processes of assist cleaning and antitheft according to the second embodiment.

FIG. 10 is a flowchart illustrating the flow of control for the assist cleaning and the antitheft.

When the keys 128A and 128B are inserted into the key cylinder 62 (the obtaining device) and the antenna 127 receives the key information (the first start information and the second start information) stored in the keys 128A and 128B (step S21, Yes), the controller device 46 (the cleaning controller device 33, the engine controller device 32) proceeds to step S22. In particular, when the antenna 127 receives, as the obtained information, the key information recorded on the key by inserting the key into the key cylinder 62 and rotating the key, the controller device 46 proceeds to step S22.

If the key information (the obtained information) obtained by the key cylinder 62 is the first start information of the key 128A, the controller device 46 determines that the rental management information has been obtained (step S22, Yes). When obtaining the rental management information, the controller device 46 (the cleaning controller device 33) starts the prime mover E1 (step S23). That is, the third cleaning controller portion 54 of the cleaning controller device 33 outputs, to the engine controller device 32, fourth command signal for preparing the assist cleaning, and the engine controller device 32 starts the prime mover E1 in response to the fourth command signal. In addition, when obtaining the rental management information, the third cleaning controller portion 54 of the cleaning controller device 33 switches the second manual switch (the manual switch) 58 to a switch for performing the assist cleaning (the manual switch 58 serves as a switch for performing the assist cleaning). That is, when the manual switch 58 is turned ON at the step S24, the cleaning controller device 33 performs the assist cleaning instead of the manual cleaning.

That is, when the manual switch 58 is operated (step S24: Yes), the third cleaning controller portion 54 outputs the third command signal to the engine controller device 32 when the PM deposits amount is equal to or higher than level 1, thereby performing the assist cleaning (step S25). If the manual switch 58 is not operated (step S24: No), the third cleaning controller portion 54 does not output the third command signal to the engine controller device 32 and does not perform the assist cleaning.

On the other hand, when the key information obtained by the key cylinder 62 is not the first start information of the key 128A but other information, for example, when the key information obtained by the key cylinder 62 is the first start information of the key 128B (step S22, No), the controller device 46 collate the first start information of the key 128B and the second start information of the start controller portion 126 (step S26). When the first start information and the second start information are matched with each other (step S27, Yes), the start controller portion 126 starts the prime mover E1 (step S28). In this case, when the PM deposits amount reaches level 2 and the manual switch 58 is operated, the manual cleaning is performed by the second cleaning controller portion 53 (the cleaning controller portion 47). In addition, the start controller portion 126 does not start the prime mover E1 when the first start information and the second start information are not match with each other (S27: No).

As described above, the assist cleaning (the DPF cleaning) can be performed when the key cylinder 62 (the obtaining device) obtains the rental management information and then the third cleaning controller portion 54 obtains a commend from the manual switch 58. In FIG. 10, it is not always necessary to judge at step S24 whether or not the manual switch 58 has been operated. That is, when the key information obtained by the key cylinder 62 is the rental management information, the third cleaning controller portion 54 may cause the engine controller device 32 to execute processes such as the starting of the prime mover E1 and the post injection. In other words, it is only necessary to perform the DPF cleaning when the key cylinder 62 (the obtaining device) obtains the rental management information.

In addition, the first start information stored in the management key 128A is the shared information (shared as the start information and the rental management information) for starting the prime mover E1 and for performing the assist cleaning. However, the information (the first start information) for starting the prime mover E1 and the information for performing the assist cleaning (the rental management information) may be stored separately in the management key 128A. In addition, only the rental management information may be stored in the management key 128A without storing the first start information.

In the embodiment described above, the rental management information is stored in the management key 128A, and the assist cleaning is performed when the key cylinder 62 obtains the rental management information. However, the method for obtaining the rental management information may employ another method not described in the embodiments described above.

Figure 11:
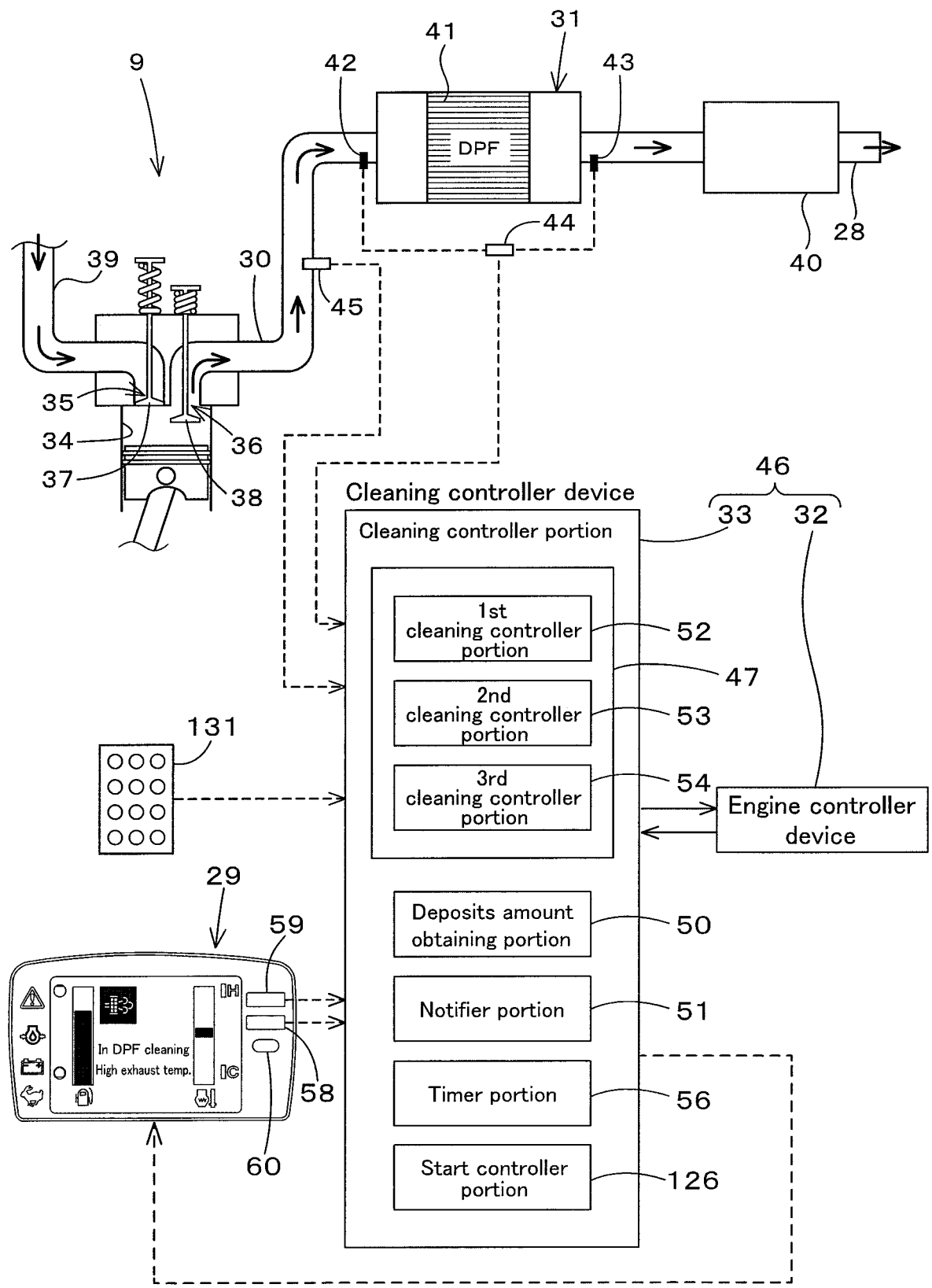
FIG. 11 is a view illustrating structures of an exhaust system and a control system according to a first modified example of the second embodiment.

FIG. 11 shows a first modified example of the second embodiment. In the working machine 1 according to the first modified example, the obtaining device is not the key cylinder 62 but an input device 131 configured to receive an input from the manager or the like. The input device 131 is a numeric keypad for inputting a numerical value from 0 to 9, for example. The input device 131 may be any device that accepts input, and may be the display device 29 that is provided in the working machine 1 and displays information related to the working machine 1.

The numeric keypad 131 is connected to the controller device 46 (the cleaning controller device 33). When the obtained information received by the numeric keypad 131 is the first start information, the start controller portion 126 collates the first start information inputted to the numeric keypad 131 with the second start information stored in the start controller portion 126. If they match with each other, the prime mover E1 is started, and if they do not match with each other, the prime mover E1 is not started.

Figure 12:
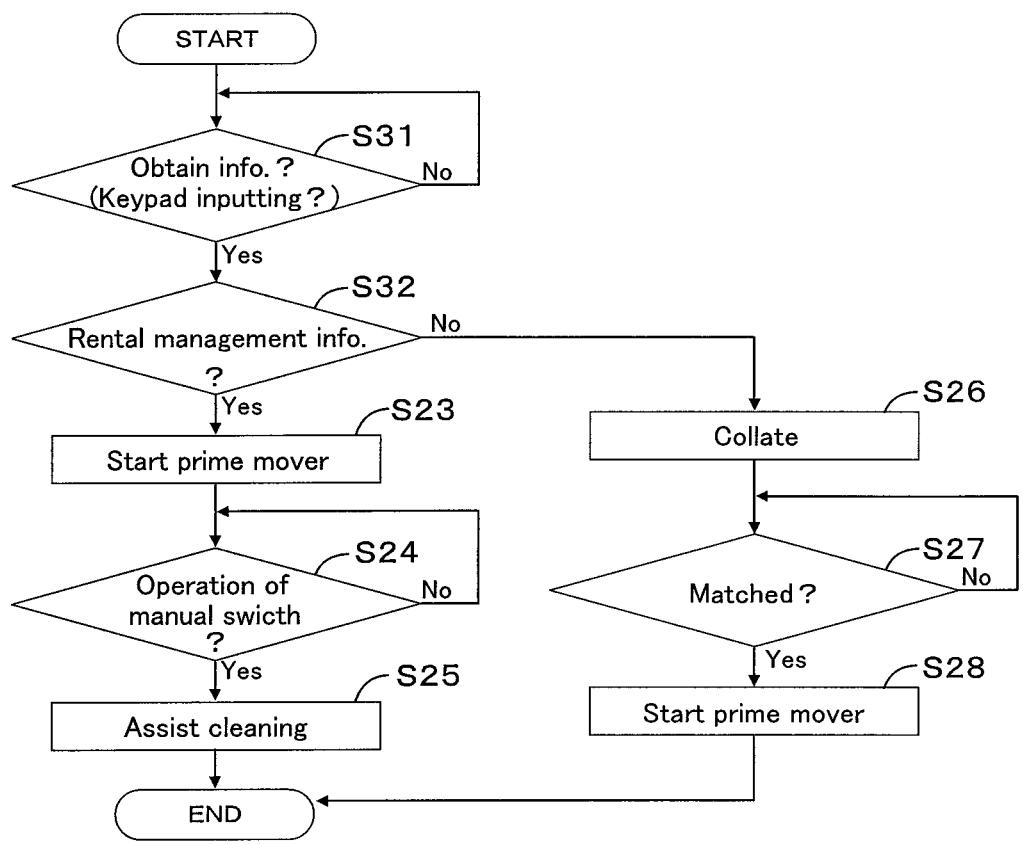
FIG. 12 is a flowchart showing processes of assist cleaning and antitheft according to the first modified example.

FIG. 12 is a flowchart illustrating a flow of control for the assist cleaning and the antitheft. Since steps S23 to S28 in FIG. 12 are the same as those in FIG. 10, descriptions thereof will be omitted.

When the information (the obtained information) is inputted to the numeric keypad (the obtaining device) 131 (step S31, Yes), the controller device 46 (the cleaning controller device 33, the engine controller device 32) proceeds to step S32. In particular, when a four-digit number is input to the numeric keypad 131, the controller device 46 proceeds to step S32.

The controller device 46 judges whether or not the obtained information (the four-digit number) received by the numeric keypad 131 is the rental management information (step S32). For example, the cleaning controller device 33 stores in advance the management information for performing the assist cleaning (for example, a four-digit number). When the obtained information received by the numeric keypad 131 (the four-digit number) and the management information (the four-digit number) stored in the cleaning controller device 33 are matched with each other, the controller device 46 determines that the rental information has been obtained (step S32, Yes).

As described above, the assist cleaning (the DPF cleaning) can be performed when the numeric keypad (the obtaining device) 131 obtains rental management information and then the third cleaning controller portion 54 obtains a command of the manual switch 58.

Figure 13:
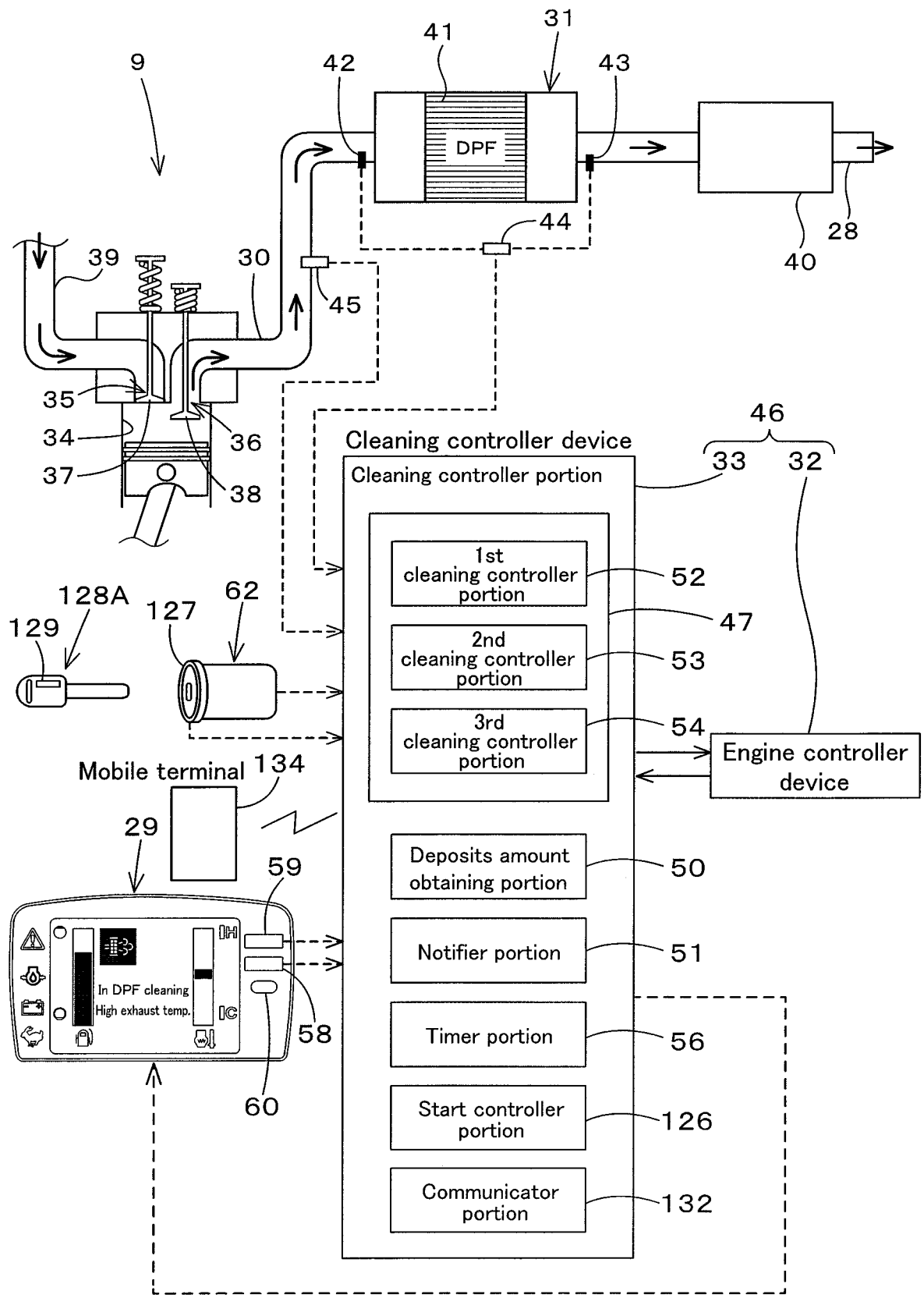
FIG. 13 is a view illustrating structures of an exhaust system and a control system according to a second modified example of the second embodiment.

FIG. 13 shows a second modified example of the second embodiment. In the working machine 1 according to the second modified example, the obtaining device is the communicator portion 132 configured to receive the rental management information transmitted from a management terminal such as the mobile terminal 134.

The mobile terminal (the management terminal) 134 is a terminal that is managed by the rental company and stored in the store, and is owned by a manager or the like of the rental company. The mobile terminal 134 is constituted of, for example, a smart phone (a multi-function mobile phone) or a tablet PC having a relatively high computing capability. Various information can be inputted to the mobile terminal 134, and the inputted information (the input information) can be transmitted to the communicator portion 132.

The communicator portion 132 is a device that is provided in the cleaning controller device 33 and performs the wireless communication using, for example, Wi-Fi (Wireless Fidelity, registered trademark) in IEEE 802.11 series that is a communication standard. The communicator portion 132 may be a device that performs the wireless communication through a mobile phone communication network or may be a device that performs the wireless communication through a data communication network.

The communicator portion 132 can receive the rental management information transmitted from the mobile terminal 134. The mobile terminal (the management terminal) 134 is a terminal that is managed by the rental company and stored in the store, and is owned by a manager or the like of the rental company. The mobile terminal 134 is constituted of, for example, a smart phone (a multi-function mobile phone) or a tablet PC having a relatively high computing capability. Various information can be inputted to the mobile terminal 134, and the inputted information (input information) can be transmitted to the communicator portion 132.

Figure 14:
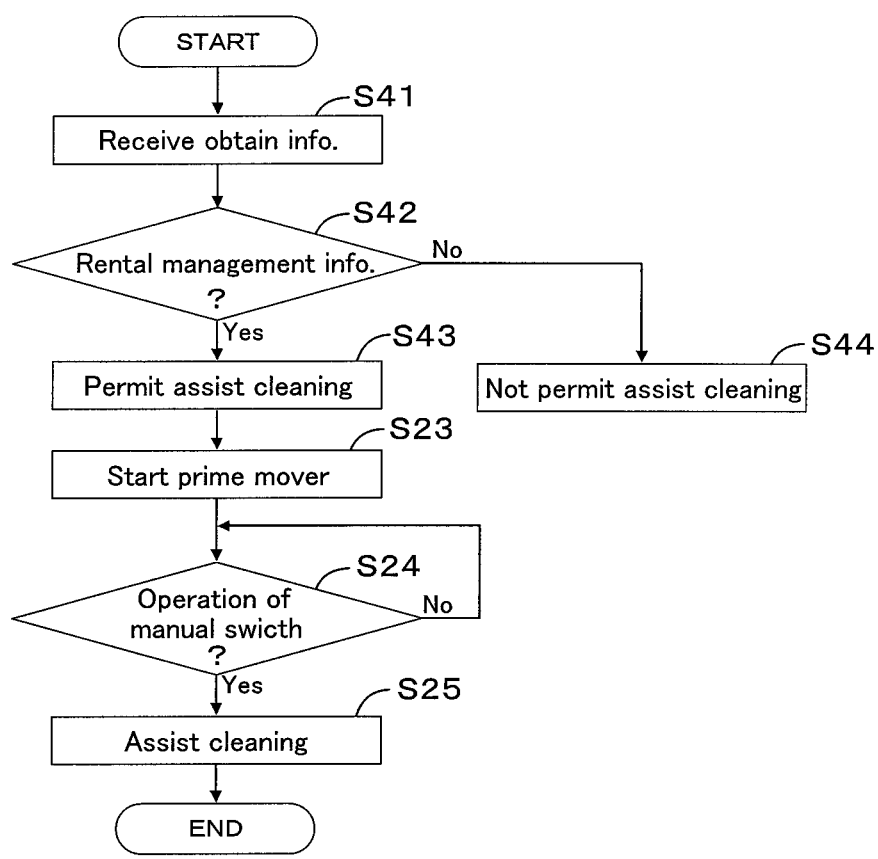
FIG. 14 is a flowchart showing processes of assist cleaning and antitheft according to the second modified example.

FIG. 14 is a flowchart illustrating the flow of control for the assist cleaning. Since steps S23 to S25 in FIG. 14 are the same as those in FIG. 10, descriptions thereof will be omitted.

When the communicator portion (the obtaining device) 132 obtains the input information inputted to the mobile terminal 134 (step S41), the controller device 46 (the cleaning controller device 33) proceeds to step S42. In particular, after four-digit number of the input information is inputted to the mobile terminal 134, the communicator portion 132 transmits the four-digit number of the input information to the mobile terminal 134, and then when the communicator portion 132 receives the four-digit number of the input information transmitted from the mobile terminal 134, the controller device 46 proceeds to step S32.

The controller device 46 judges whether or not the obtained information (the input information) received by the communicator portion 132 is the rental management information (step S42, Yes). For example, the cleaning controller device 33 stores in advance the management information (for example, a four-digit number) for performing the assist cleaning, and then when the obtained information (the four-digit number) received by the communicator portion and the management information (the four-digit number) stored in the cleaning controller device 33 matches with each other, the controller device 46 determines that the rental information has been obtained (step S42, Yes). When the rental information is obtained, the third cleaning controller portion 54 of the cleaning controller device 33 permits the assist cleaning (step S43). After the permission of the assist cleaning, the assist cleaning is performed when the manual switch 58 is turned on as shown in steps S23 to S25. In addition, after the assist cleaning is finished, the prime mover E1 stops. On the other hand, when the rental management information is not obtained, the third cleaning controller portion 54 of the cleaning controller device 33 does not permit the assist cleaning (step S44).

As described above, the assist cleaning (the DPF cleaning) can be performed when the communicator portion (the obtaining device) 132 obtains the rental management information and then the third cleaning controller portion 54 obtains a command from the manual switch 58.

Figure 15:
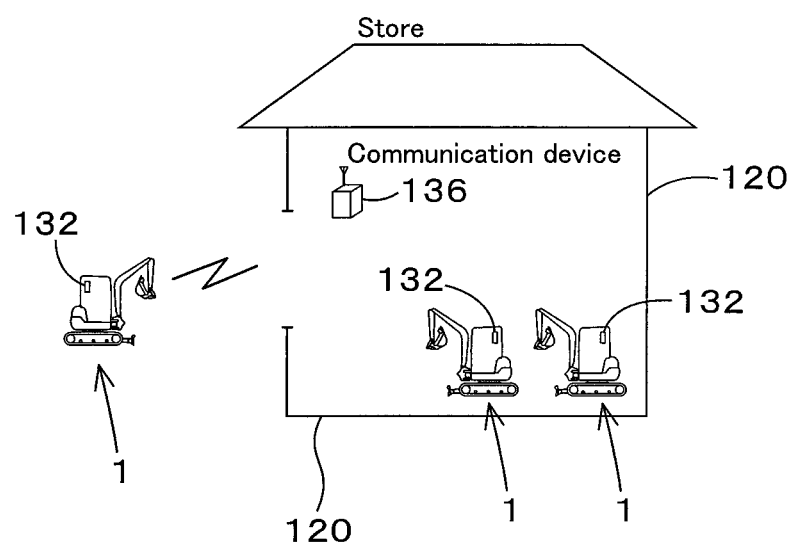
FIG. 15 is a schematic view showing a third modified example of the second embodiment.

FIG. 15 shows a third modified example of the second embodiment. In the third modified example, the obtaining device is the communicator portion 132 that receives the rental management information transmitted from a management terminal such as the communication device 136.

The communication device 136 is a device provided in the vicinity of a storage location where the working machine 1 is stored in the store, and outputs the store information (a store location, a store management number, a store address, and the like) regarding the store. The communication distance of the communication device 136 is preferably set to several meters to several tens of meters when the communication device 136 is provided at the entrance/exit of the storage location. The communicator portion 132 is capable of receiving the store information transmitted from the communication device 136.

When the working machine 1 approaches the store (the storage location), the communicator portion 132 of the working machine 1 receives the store information transmitted from the communication device 136. When the obtained information received by the communicator portion 132 is the "store information", the controller device 46 determines that it is the rental management information. When the rental management information is received, the third cleaning controller portion 54 of the cleaning controller device 33 performs the assist cleaning. For example, after the communicator portion 132 receives the rental management information, the third cleaning controller portion 54 switches the manual switch 58 to a switch configured to perform the assist cleaning, and then the prime mover E1 is started and the assist cleaning is performed when the manual switch 58 is turned on. In the third modified example, the assist cleaning may be performed without operating the manual switch 58. In addition, it may be detected with positioning satellite systems such as the GPS that the working machine 1 returned to the store.

In the second embodiment including the above-described modified example, the manual switch 58 serves a switch for both the manual cleaning and the assist cleaning. However, a dedicated switch for the assist cleaning (an assist cleaning switch) may be provided. That is, the assist cleaning may be performed by providing the working machine 1 with the first manual switch (the assist cleaning switch) 55 shown in the first embodiment, and the assist cleaning may be performed by turning on the assist cleaning switch 55 under the state where the rental management information is obtained. As described above, when the rental management information is obtained and then the assist cleaning is executed depending on whether or not the switch is operated, the existing switch provided in the working machine 1 may be employed as the assist cleaning switch 55. For example, an existing switch may be employed as the assist cleaning switch when the PM deposits amount is in level 1 and the vehicle is parked. In addition, for example, a horn switch for sounding a horn, a wiper switch for instructing the operation of wiper, or the like may be used as the assist cleaning switch.

According to the above description, the working machine includes the obtaining device that can obtain the rental management information for managing the rental, and includes the cleaning controller portion 47 that combusts the particulate matter caught by the filter 41 when the obtaining device obtains the rental management information. In this manner, since the DPF cleaning can be performed when the obtaining device obtains the rental management information, the working machine can be lent or stored with the cleaned filter 41.

In addition, the working machine 1 includes manual switches 58 and 55, and the cleaning controller portion 47 combusts the particulate matters caught by the filter 41 when the obtaining device obtains the rental management information and obtains a command from the manual switches 58 and 55. According to that configuration, the manager or the like can surely perform the DPF cleaning in the state where the working machine 1 is stored in a store or the like of the rental company.

In addition, the obtaining device 130 includes an input device 131 configured to receive information inputted, and the cleaning controller portion 47 combusts the particulate matters caught by the filter 41 when the obtained information received by the input device 131 is the rental management information. According to that configuration, the DPF cleaning can be performed when the manager inputs the rental management information to the input device.

In addition, the obtaining device 130 has a key cylinder 62 configured to receive the key 128A for storing the start information, and the cleaning controller portion 47 combusts the particulate matters caught by the filter 41 when the start information stored in the key 128A is the rental management information. According to that configuration, the DPF cleaning can be easily and reliably started simply by the manager or the like who inserts the key 128A storing the start information into the key cylinder 62.

In addition, the obtaining device 130 includes the communicator portion 132 configured to receive information transmitted from the mobile terminal, and the cleaning controller portion 47 combusts the particulate matters caught by the filter 41 when the information received by the communicator portion 132 is the rental management information. According to that configuration, the DPF cleaning can be easily started simply by the manager or the like who transmits the rental management information to the working machine 1 (the communicator portion 132) using the mobile terminal.

The filter cleaning system of the working machine 1 includes a filter 41 configured to catch the particulate matter included in exhaust gas discharged from the prime mover E1, an obtaining device configured to obtain the rental management information for managing rental, and the cleaning controller portion 47 configured to combust the particulate matter caught by the filter 41 when the obtaining device obtains the rental management information. According to that configuration, the manager or the like can surely perform the DPF cleaning in the state where the working machine 1 is stored in a store or the like of the rental company.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modified examples within and equivalent to a scope of the claims.

What is claimed is:

1. A working machine comprising:
   a manual switch;
   a filter to catch particulate matters included in exhaust gas that is exhausted from a prime mover; and
   a processor and a memory that stores an instruction, wherein upon execution of the instruction, the processor operates as:
      a first cleaning controller to perform automatic cleaning that combusts the particulate matters automatically regardless of a command from the manual switch, when a deposits amount of the particulate matters caught by the filter is a first deposits amount threshold or more;
      a second cleaning controller to perform manual cleaning that combusts the particulate matters based on the command from the manual switch when the deposits amount is equal to or more than a second deposits amount threshold that is larger than the first deposits amount threshold; and
      a third cleaning controller to perform assist cleaning that combusts the particulate matters based on the command from the manual switch when the deposits amount is equal to or more than the first deposits amount threshold and smaller than the second deposits amount threshold.

2. The working machine according to claim 1,
   wherein the third cleaning controller performs the assist cleaning after the first cleaning controller stops the automatic cleaning and then a predetermined time has elapsed such that engine oil of the prime mover is prevented from being diluted with fuel during a post-injection of fuel for combusting the particulate matters in the assist cleaning.

3. The working machine according to claim 1,
   wherein the third cleaning controller performs the assist cleaning upon obtaining the command from the manual switch after the first cleaning controller stops the automatic cleaning and then a predetermined time has elapsed such that engine oil of the prime mover is prevented from being diluted with fuel during a post-injection of fuel for combusting the particulate matters in the assist cleaning.

4. The working machine according to claim 2, wherein upon execution of the instruction, the processor further operates as:
   a notifier to notify that the deposits amount is equal to or more than the first deposits amount threshold and smaller than the second deposits amount threshold after the predetermined time has elapsed.

5. The working machine according to claim 1,
   wherein the manual switch includes:
      a first manual switch to command the assist cleaning; and
      a second manual switch to command the manual cleaning.

6. The working machine according to claim 1,
   wherein the third cleaning controller stops the prime mover after stopping the assist cleaning.

7. The working machine according to claim 2,
   wherein the third cleaning controller stops the prime mover after stopping the assist cleaning.

8. The working machine according to claim 3,
   wherein the third cleaning controller stops the prime mover after stopping the assist cleaning.

9. The working machine according to claim 4,
   wherein the third cleaning controller stops the prime mover after stopping the assist cleaning.

10. The working machine according to claim 5,
    wherein the third cleaning controller stops the prime mover after stopping the assist cleaning.

11. The working machine according to claim 1,
    wherein the first manual switch is arranged at such a position that is unseen from the operator on a seat.

12. The working machine according to claim 1,
    wherein the first manual switch is arranged at such a position that is accessible by the operator off a seat.

13. The working machine according to claim 1,
    wherein the first manual switch is covered by a cover capable of being opened or closed, and
    wherein the opened cover allows the operator to access the first manual switch and the closed cover bars the operator to access the first manual switch.

14. A diesel particulate filter cleaning method for a working machine, comprising:
    judging whether a deposits amount of particulate matters caught in a filter is equal to or more than a first deposits amount threshold, the filter being configured to catch the particulate matters included in exhaust gas exhausted from a prime mover;
    performing automatic cleaning that combusts the particulate matters automatically regardless of a command of a manual switch when the deposits amount is a first deposits amount threshold or more;
    judging, after the automatic cleaning is stopped, whether the deposits amount of the particulate matters is equal to or more than the first deposits amount threshold and smaller than a second deposits amount threshold that is larger than the first deposits amount threshold; and
    performing, after the automatic cleaning is stopped, assist cleaning that combusts the particulate matters based on the command of a manual switch when the deposits amount is equal to or more than the first deposits amount threshold and smaller than the second deposits amount threshold.

15. The diesel particulate filter cleaning method for the working machine according to claim 14,
    wherein the assist cleaning is performed after the automatic cleaning is stopped and then a predetermined time has elapsed such that engine oil of the prime mover is prevented from being diluted with fuel during a post-injection of fuel for combusting the particulate matters in the assist cleaning.

16. A working machine comprising:

a filter to catch particulate matters included in exhaust gas that is exhausted from a prime mover;

a first controller configured to perform a filter cleaning by combusting the particulate matters therein regardless of the operator's intention, when a deposits amount of the particulate matters in the filter is increased beyond a first threshold;

a second controller configured to perform the filter cleaning in response to a command from a second manual switch, when the deposits amount of the particulate matters in the filter is increased beyond a second threshold greater than the first threshold;

a key cylinder configured to receive either one of a management key used by a manager of the working machine and a user key used by the operator, and to start the prime mover after receiving the management key in the key cylinder; and a third controller configured to perform the filter cleaning when the key cylinder receives the management key, and the deposits amount of the particulate matters in the filter is between the first threshold and the second threshold.

17. The working machine according to claim 16, wherein the third controller performs the filter cleaning after the first controller stops the filter cleaning and then a predetermined time has elapsed such that engine oil of the prime mover is prevented from being diluted with fuel during a post-injection of fuel for combusting the particulate matters in the filter cleaning, which is performed by the third controller.

18. The working machine according to claim 16, wherein the third controller performs the filter cleaning regardless of a command from the first manual switch operated by the operator.

* * * * *